US 8,175,422 B2

(12) United States Patent
Okazaki et al.

(10) Patent No.: US 8,175,422 B2
(45) Date of Patent: May 8, 2012

(54) OPTICAL MODULATOR

(75) Inventors: Masahide Okazaki, Kyoto (JP);
Toshiaki Suhara, Osaka (JP)

(73) Assignee: Dainippon Screen Mfg. Co., Ltd. (JP)

( * ) Notice: Subject to any disclaimer, the term of this patent is extended or adjusted under 35 U.S.C. 154(b) by 310 days.

(21) Appl. No.: 12/638,342

(22) Filed: Dec. 15, 2009

(65) Prior Publication Data

US 2010/0166356 A1     Jul. 1, 2010

(30) Foreign Application Priority Data

Dec. 26, 2008  (JP) ................................ 2008-332119
Dec. 26, 2008  (JP) ................................ 2008-332120
Dec. 26, 2008  (JP) ................................ 2008-332121

(51) Int. Cl.
*G02F 1/295*       (2006.01)
*G02B 6/26*        (2006.01)
*G02B 6/42*        (2006.01)

(52) U.S. Cl. ................................... 385/8; 385/4; 385/40

(58) Field of Classification Search .................. 385/1, 2, 385/4, 8, 10, 40
See application file for complete search history.

(56) References Cited

U.S. PATENT DOCUMENTS

| 5,076,658 | A  | * | 12/1991 | Hayden et al. ................ 385/1   |
| 5,734,772 | A  | * | 3/1998  | Gopalan et al. ............. 385/122   |
| 5,875,053 | A  | * | 2/1999  | Webjorn et al. ............. 359/326   |
| 6,169,565 | B1 |   | 1/2001  | Ramanujan et al.                       |
| 6,473,542 | B1 |   | 10/2002 | Yamada et al.                          |
| 7,486,432 | B2 | * | 2/2009  | Chu et al. .................... 359/321|
| 7,916,383 | B2 | * | 3/2011  | Yoshino ..................... 359/326  |
| 2002/0101648 | A1 | * | 8/2002 | Arie et al. ................ 359/326  |
| 2003/0077037 | A1 | * | 4/2003 | Ovadia et al. ............... 385/37  |
| 2004/0096160 | A1 | * | 5/2004 | Hinkov et al. ................ 385/40 |
| 2004/0207903 | A1 | * | 10/2004 | Apostolopoulos et al. ... 359/321   |
| 2007/0058896 | A1 | * | 3/2007 | Toyoda et al. ................. 385/3 |
| 2007/0097387 | A1 |   | 5/2007  | Tamaki                                |

FOREIGN PATENT DOCUMENTS

| JP | 7-89180      | 9/1995  |
| JP | 10-83001     | 3/1998  |
| JP | 2000-98432   | 4/2000  |
| JP | 2000-313141  | 11/2000 |
| JP | 2007-121881  | 5/2007  |
| JP | 2008-225279  | 9/2008  |

OTHER PUBLICATIONS

Gnewuch, et al., "Nanosecond Response of Bragg Deflectors in Periodically Poled LiNbO3," IEEE Photonics Technology Letters, vol. 10, No. 12, pp. 1730-1732 (Dec. 1998).

"Light Deflection for Applied Electric Fields in Optical Phased-Array Deflector Composed of Sawtooth-Shaped Periodic Domain-Inverted Structure," Transactions of the Institute of Electronics, Information and Communication Engineers C, vol. J88-C, No. 2, pp. 127-130 (Feb. 1, 2005); with concise explanation in the English Language.

* cited by examiner

*Primary Examiner* — Rhonda Peace
(74) *Attorney, Agent, or Firm* — Ostrolenk Faber LLP

(57) ABSTRACT

In an optical modulator, a first electrode portion having a plurality of first electrodes is provided on the upper surface of a base part having a periodically-poled structure and a second electrode portion is provided on the lower surface thereof, and voltage is applied in one direction between the first electrode portion and the second electrode portion, to thereby cause a periodic change of the refractive index in a polarization-part array direction in the periodically-poled structure and diffract light which enters the base part. This allows reduction in the voltage applied between the first electrode portion and the second electrode portion, and it is thereby possible to form a desired electric field inside the periodically-poled structure while achieving a high-density channel arrangement. By reducing the voltage, the rate of the optical modulation performed by the optical modulator can be increased.

18 Claims, 12 Drawing Sheets

OPTICAL MODULATOR

TECHNICAL FIELD

The present invention relates to an optical modulator for modulating incident light.

BACKGROUND ART

Conventionally, a technique for performing optical modulation using a material of which the refractive index is changed by an electric field, such as lithium niobate ($LiNbO_3$) or the like. Japanese Patent Application Laid Open Gazette No. 2000-313141 (Document 1), for example, discloses an optical modulator in which a plurality of electrode elements are arrayed in one direction on one main surface of a thick plate-like electro-optic substrate. In the optical modulator, an electric field is produced inside the substrate by applying voltage between adjacent electrode elements, and this enables diffraction of light travelling inside the electro-optic substrate.

Actually, inside the electro-optic substrate, the range (in a thickness direction) in which the refractive index is changed depends on the voltage applied between the electrode elements. In the optical modulator of Document 1, the electrode elements are elongated in a traveling direction of light and light which enters the electro-optic substrate from one end surface thereof and travels thereinside is caused to enter the electro-optic substrate at a small angle (at a large incident angle) with respect to a main surface on which the electrode elements are formed and to be totally reflected on the main surface, to thereby produce a phase difference required to diffract the light. At that time, a relatively large voltage of 60V to 100V needs to be applied between the electrode elements.

"Nanosecond Response of Bragg Deflectors in Periodically Poled $LiNbO_3$" by Harald Gnewuch, Christopher N. Pannell, Graeme W. Ross, Peter G. R. Smith, and Harald Geiger, IEEE PHOTONICS TECHNOLOGY LETTERS, DECEMBER 1998, VOL. 10, NO. 12, pp. 1730-1732 (Document 2) discloses a technique in a deflector, in which one electrode is provided on each of the upper and lower surfaces of a substrate of lithium niobate having a periodically-poled structure and by changing voltage to be applied between the respective electrodes on the upper and lower surfaces, light entering the substrate is caused to exit as zeroth order beams or exit as first order diffracted beams due to Bragg diffraction.

In order to achieve high-speed modulation in an optical modulator, however, it is necessary to reduce the voltage applied between electrode elements. If such an optical modulator is used for an image recording apparatus for recording an image on a recording material by irradiating the recording material with light, it is necessary to shorten the distance between the electrode elements in order to respond to high definition of the image, and also in this case, it is necessary to reduce the voltage applied between the electrode elements. In Document 1, however, a relatively large voltage (e.g., 100V) needs to be applied between the electrode elements for the purpose of producing a phase difference required to diffract the incident light, and it is therefore impossible to reduce the voltage applied between the electrode elements. Further, for the purpose of preventing discharge (leakage) between the electrode elements, it is also impossible to shorten the distance between the electrode elements.

SUMMARY OF INVENTION

The present invention is intended for an optical modulator, and it is an object of the present invention to reduce voltage to be applied between electrodes in the optical modulator and ensure a high-density channel arrangement.

According to the present invention, the optical modulator comprises a base part which is a plate-like member formed of a material of which the refractive index is changed by an electric field, having a periodically-poled structure in which a first polarization part and a second polarization part which are opposite in the direction of polarization produced when the electric field is applied are alternately arranged in a polarization-part array direction and a modulation part having a first electrode portion provided on one main surface of the base part and a second electrode portion provided on the other main surface of the base part, which applies voltage between the first electrode portion and the second electrode portion to thereby cause a periodic change of the refractive index in the polarization-part array direction in the periodically-poled structure, and in the optical modulator of the present invention, a linear light beam spreading out in the polarization-part array direction enters the base part from one end surface thereof, being guided inside the base part in a traveling direction in which the light beam is diffracted by the periodic change of the refractive index, and exits from the other end surface, the first electrode portion comprises a plurality of first electrodes arranged in an electrode array direction parallel to the polarization-part array direction or perpendicular to the traveling direction, each of the plurality of first electrodes is disposed on a polarization part group including a predetermined number of first polarization parts and/or second polarization parts which are arranged successively in the polarization-part array direction, and voltages applied between the plurality of first electrodes and the second electrode portion are equal and individually controlled. By the present invention, it is possible to reduce the voltage applied between the electrodes in the optical modulator and achieve a high-density channel arrangement.

According to one preferred embodiment of the present invention, the traveling direction is perpendicular to the polarization-part array direction.

According to another preferred embodiment of the present invention, the polarization part group includes a predetermined number, which is three or more, of polarization pairs arranged successively in the polarization-part array direction and each of the polarization pairs includes the first polarization part and the second polarization part which are adjacent to each other in the polarization-part array direction.

According to still another preferred embodiment of the present invention, the polarization part group includes a predetermined number, which is four or less, of first polarization parts and second polarization parts which are arranged successively in the polarization-part array direction.

According to yet another preferred embodiment of the present invention, the optical modulator further comprises a supporting member provided on an opposite side of the first electrode portion to the base part or on an opposite side of the second electrode portion to the base part, for supporting the first electrode portion, the base part, and the second electrode portion. It is thereby possible to increase the strength of the optical modulator.

In the optical modulator, the linear light beam is propagated inside the base part in a single mode. Further, an annealed/proton-exchanged waveguide is formed near the one main surface of the base part or near the center portion of the base part in a thickness direction, and the linear light beam is propagated inside the waveguide.

These and other objects, features, aspects and advantages of the present invention will become more apparent from the following detailed description of the present invention when taken in conjunction with the accompanying drawings.

DESCRIPTION OF EMBODIMENTS

Figure 1:
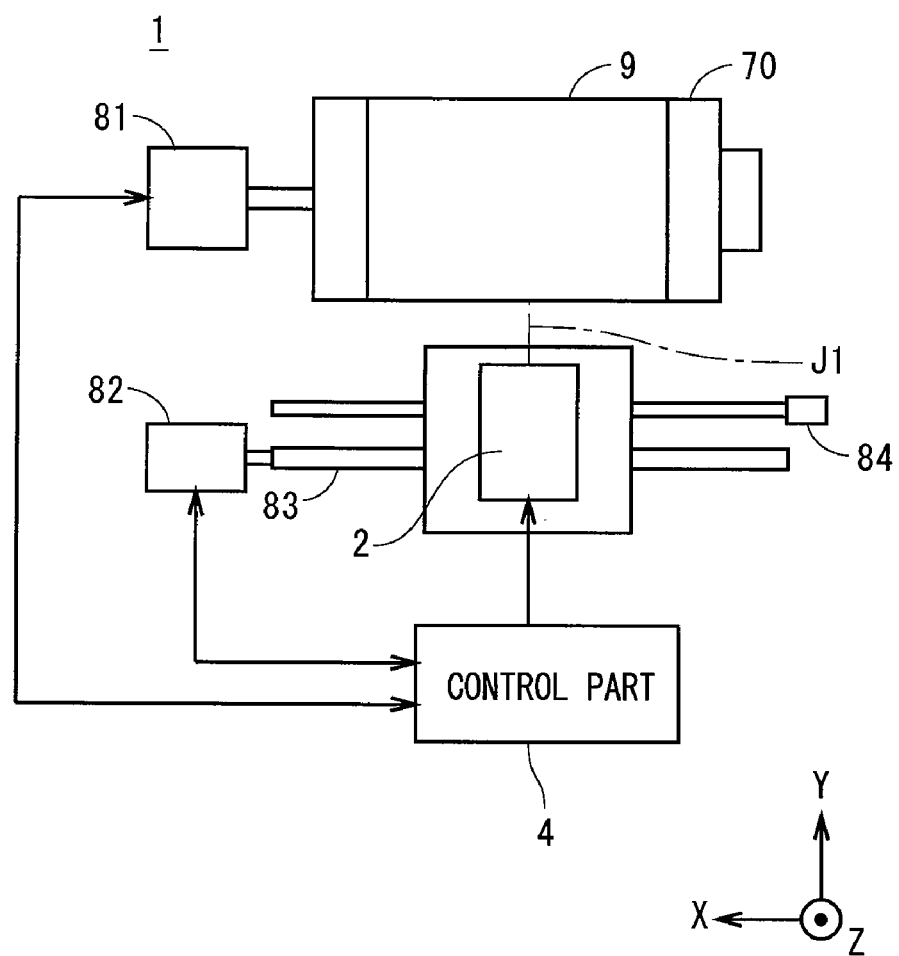
FIG. 1 is a view showing a configuration of an image recording apparatus in accordance with a first preferred embodiment.

FIG. 1 is a view showing a configuration of an image recording apparatus 1 in accordance with the first preferred embodiment of the present invention. The image recording apparatus 1 comprises an optical head 2 for emitting light for writing along a Y direction (a direction parallel to an optical axis J1 of the optical head 2) of FIG. 1, a holding drum 70 serving as a holding part for holding a recording material 9 for recording an image thereon on the outer side surface thereof, and a control part 4 for generally controlling the image recording apparatus 1. An image is recorded on the recording material 9 by emitting the light for writing thereto from the optical head 2 while scanning the light (in other words, through irradiation with light, an image is written thereon). As the recording material 9, for example, used is a photosensitive material such as a printing plate, a film for forming a printing plate, or the like. A photosensitive drum for plateless printing may be used as the holding drum 70, and in such a case, the recording material 9 corresponds to a surface of the photosensitive drum and it can be understood that the holding drum 70 holds the recording material 9 as one unit.

The holding drum 70 is rotated about the central axis of its cylindrical surface by a motor 81, and this moves the optical head 2 relatively to the recording material 9 at a constant speed in a main scan direction (i.e., a direction perpendicular to the rotation axis of the holding drum 70). The optical head 2 is movable by a motor 82 and a ball screw 83 in a subscan direction parallel to the rotation axis of the holding drum 70 (i.e., an X direction of FIG. 1 perpendicular to the main scan direction), and a position of the optical head 2 is detected by an encoder 84. Thus, by a scanning mechanism including the motors 81 and 82 and the ball screw 83, an irradiation position of light from the optical head 2 on the recording material 9 is moved relatively to the recording material 9 in the main scan direction at a constant speed and also relatively moved in the subscan direction crossing the main scan direction.

Figure 2:
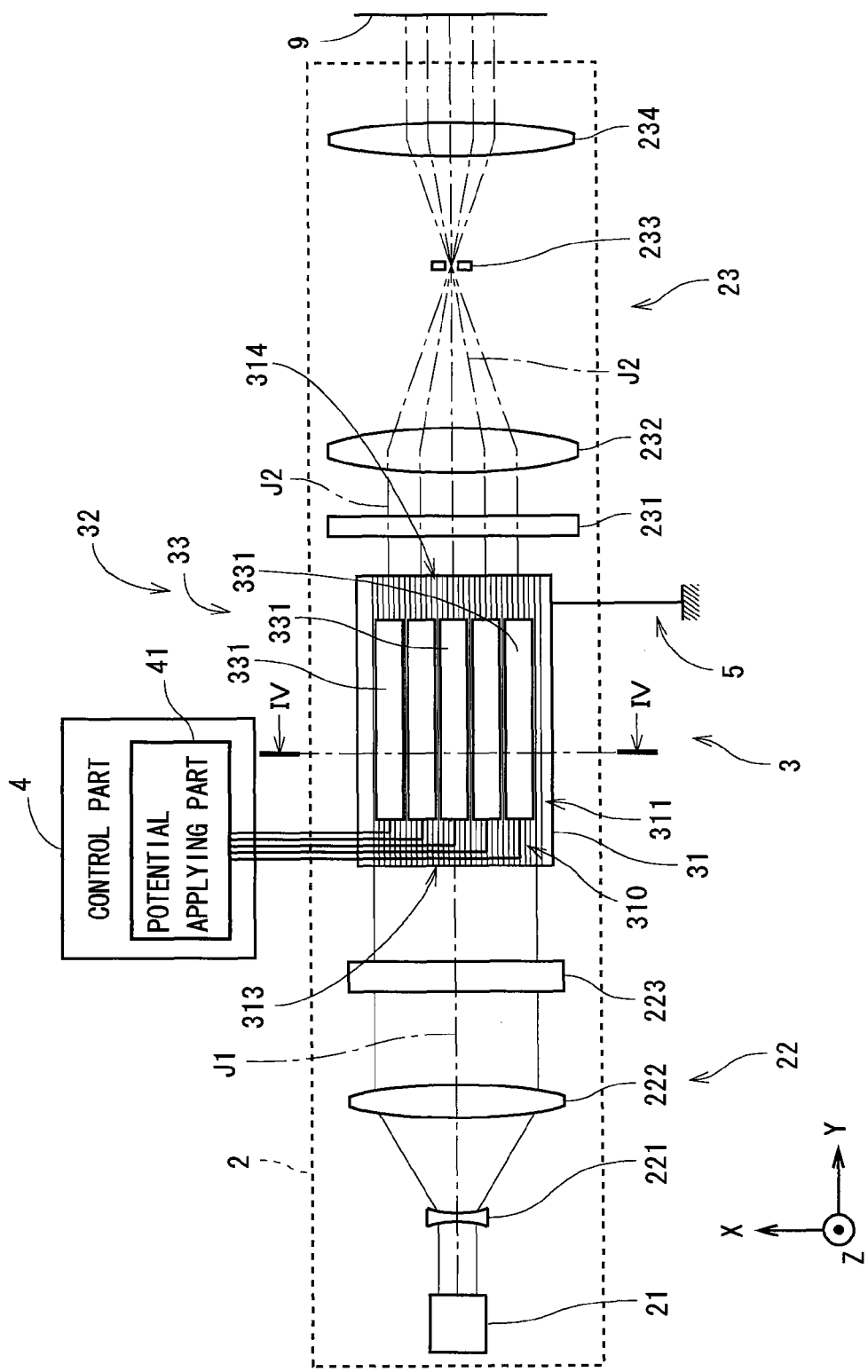
FIGS. 2 and 3 are views each showing an internal configuration of an optical head.
Figure 3:
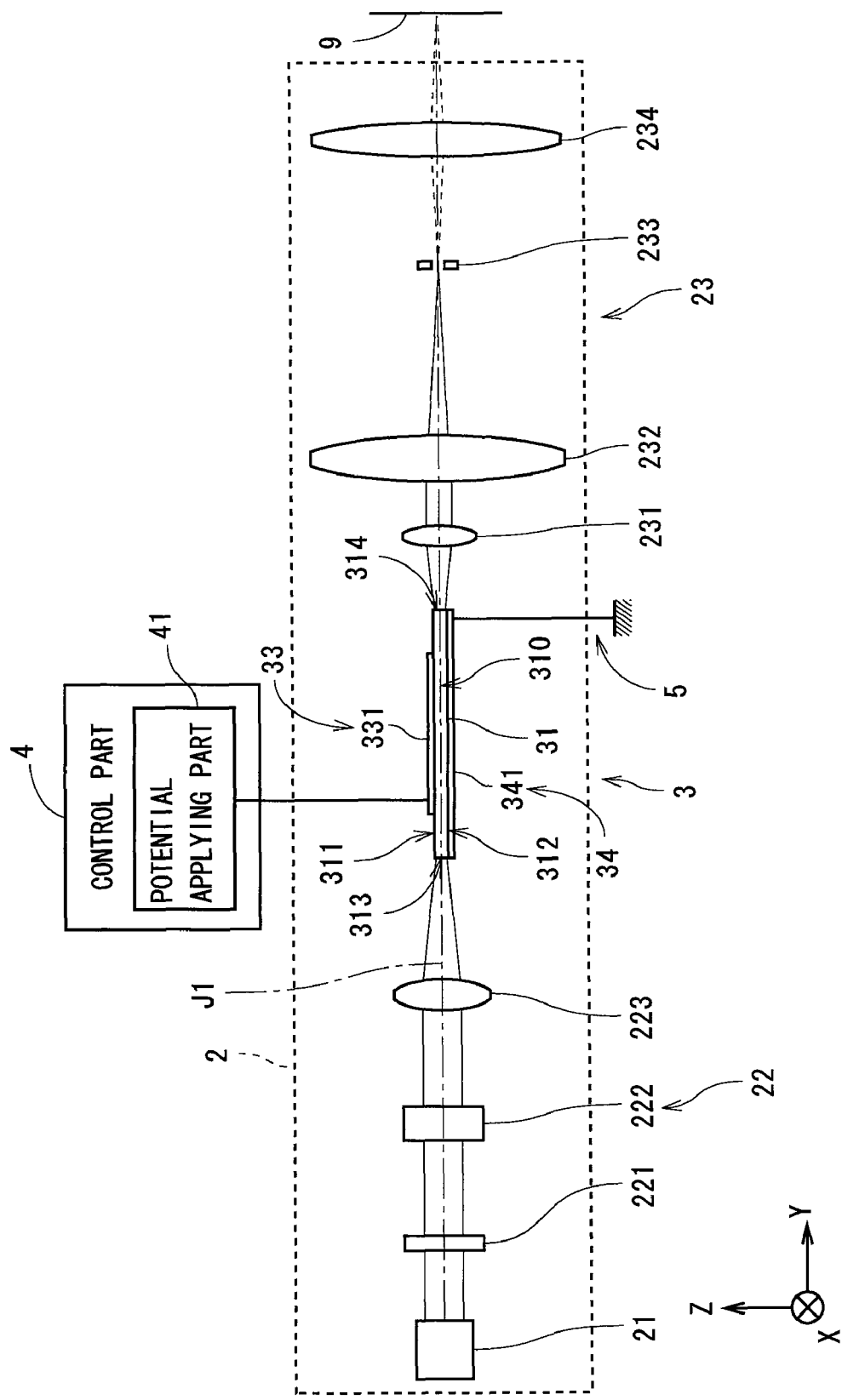

FIGS. 2 and 3 are views each simply showing an internal configuration of the optical head 2. FIG. 2 shows the internal configuration of the optical head 2 as viewed from the upper side (i.e., a (+Z) side of FIG. 1) along a direction perpendicular to the optical axis J1 of the optical head 2 and the subscan direction in FIG. 1 (i.e., a Z direction perpendicular to the X direction and the Y direction of FIG. 1), and FIG. 3 shows the internal configuration of the optical head 2 as viewed from a side opposite to the motor 82 of FIG. 1 along the subscan direction (in other words, as viewed from a (−X) side of the optical head 2 toward a (+X) side thereof).

The optical head 2 shown in FIGS. 2 and 3 comprises a light source part 21 having a laser for emitting a light beam having a predetermined wavelength (e.g., 830, 635, 405, or 355 nm) (the laser may be a semiconductor laser array in which a plurality of semiconductor lasers are arrayed, or other kind of light emitting element such as a lamp or the like) and an optical modulator 3 that the light beam enter from the light source part 21. The optical modulator 3 comprises a base part 31 which is a thin plate-like (slab-like) member formed of an electro-optical crystal which is a material of which the refractive index is changed by an electric field and a modulation part 32 for diffracting the light entering the base part 31.

In the first preferred embodiment, the base part 31 is formed of single crystalline lithium niobate ($LiNbO_3$) (abbreviated to LN). The base part 31 may be formed of other material of which the refractive index is changed by polarization produced in its crystal by an electric field, such as single crystalline lithium tantalate ($LiTaO_3$) (abbreviated to LT) or the like.

The modulation part 32 comprises a first electrode portion 33 provided on a main surface 311 on the (+Z) side of the base part 31 (hereinafter, referred to as an "upper surface 311") as shown in FIGS. 2 and 3, and further comprises a second electrode portion 34 provided on a main surface 312 on the (−Z) side of the base part 31 (hereinafter, referred to as a "lower surface 312") as shown in FIG. 3. As shown in FIG. 2, the first electrode portion 33 comprises a plurality of strip-like first electrodes 331 arrayed in a predetermined electrode array direction (i.e., the X direction of FIGS. 2 and 3), each extending in the Y direction which is a direction of optical axis J1 (i.e., the traveling direction of light), and the plurality of first electrodes 331 are individually connected to an (electrical) potential applying part 41 of the control part 4. Though an exemplary case where the first electrode portion 33 comprises five first electrodes 331 will be discussed in the first preferred embodiment, actually, more number of first electrodes 331 are provided on the upper surface 311 of the base part 31. The second electrode portion 34 shown in FIG. 3 comprises a single second electrode 341 (i.e., a common electrode) opposed to the plurality of first electrodes 331 of the first electrode portion 33 with the base part 31 interposed therebetween and is connected to a grounding part 5 for applying a ground potential.

Figure 4:
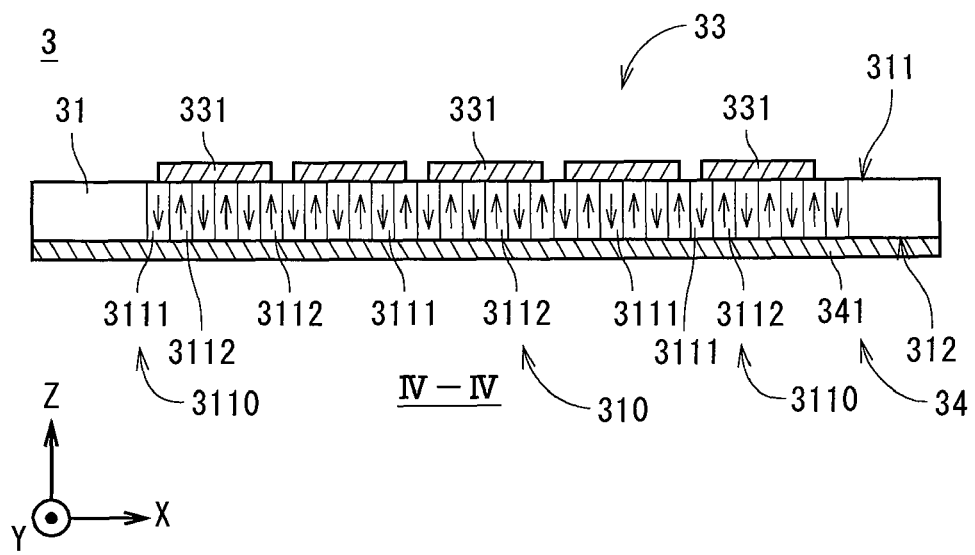
FIG. 4 is a cross section showing an optical modulator.

FIG. 4 is a cross section showing the optical modulator 3, taken along the line IV-IV of FIG. 2, and in FIG. 4, the cross section of the base part 31 is shown with no hatch (the same applies to FIGS. 12, 13, 15, 17, and 18). As shown in FIG. 4, the base part 31 has a periodically-poled structure 310 in which a plurality of first polarization parts 3111 and a plurality of second polarization parts 3112 are alternately arranged in a predetermined polarization-part array direction (i.e., the X direction of FIG. 4, which is a direction parallel to the above-discussed electrode array direction). The first polarization parts 3111 and the second polarization parts 3112 are each a strip-like part extending in the Y direction perpendicular to the polarization-part array direction. Since the crystal axis of the first polarization part 3111 and that of the second polarization part 3112 are opposite in direction, the respective directions of polarization produced when an electric field of the Z direction is applied to the periodically-poled structure 310 are opposite to each other. The direction of crystal axis in an area around the periodically-poled structure 310 of the base part 31 is the same as that of the second polarization part 3112. The periodically-poled structure 310 of the base part 31 is formed by applying very high voltage of the Z direction to a portion to become the first polarization part 3111 in the base part 31 before the periodically-poled structure 310 is formed and thereby reversing the direction of polarization in the portion to become the first polarization part 3111.

In the first preferred embodiment, the width of each first polarization part 3111 and that of each second polarization part 3112 in the polarization-part array direction (the X direction) in the periodically-poled structure 310 each range from 1.25 μm to 5 μm (in the first preferred embodiment, the width of the first polarization part 3111 and that of the second polarization part 3112 are each 5 μm). The pitch of the plurality of first polarization parts 3111 in the polarization-part array direction and that of the plurality of second polarization parts 3112 in the polarization-part array direction each range from 2.5 μm to 10 μm. In the following discussion, one first polarization part 3111 and one second polarization part 3112 which are adjacent to each other in the polarization-part array direction are referred to as a polarization pair 3110, and the pitch of a plurality of polarization pairs 3110 in the polarization-part array direction (10 μm in the first preferred embodiment) is referred to as a polarization pair pitch.

The first electrode portion 33 and the second electrode portion 34 are arranged with the periodically-poled structure 310 of the base part 31 interposed therebetween. Each of the first electrodes 331 of the first electrode portion 33 is disposed on a polarization pair group including three polarization pairs 3110 arranged successively in the polarization-part array direction. In other words, each of the first electrodes 331 is disposed on a polarization part group including six polarization parts arranged successively in the polarization-part array direction (i.e., three first polarization parts 3111 and three second polarization parts 3112 which are alternately arranged).

In the optical modulator 3, by applying a positive (+) potential (e.g., 2V to 25V) from the potential applying part 41 to the first electrodes 331 of the first electrode portion 33 (in other words, by applying voltage of the Z direction between the first electrode portion 33 and the second electrode portion 34), the direction of polarization of the three first polarization parts 3111 becomes the (−Z) direction and the direction of polarization of the three second polarization parts 3112 becomes the (+Z) direction in the polarization pair group corresponding to one first electrode 331. In FIG. 4, the direction of polarization of each polarization part is represented by an arrow.

Figure 5:
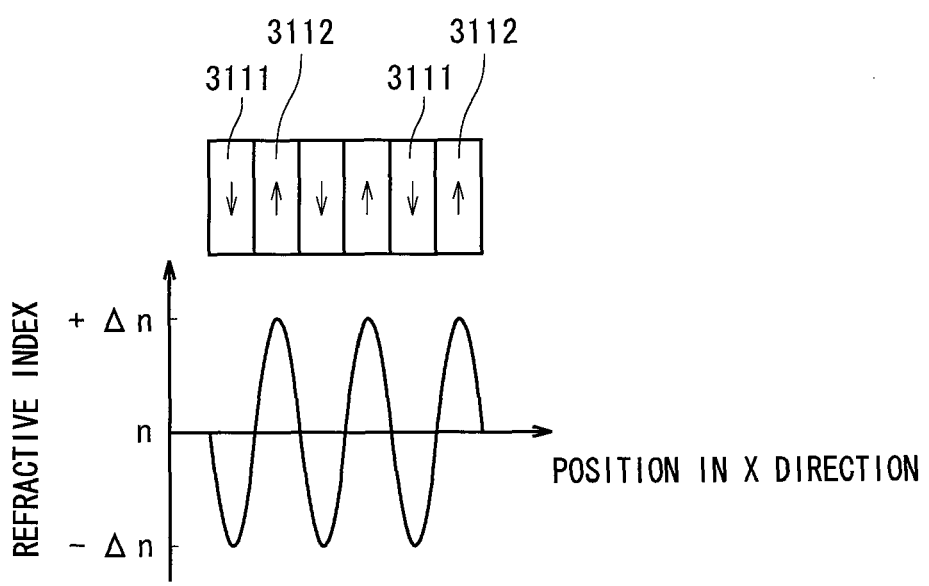
FIG. 5 is a view showing distribution of refractive index.

When the refractive index of the base part 31 in a state where no electric field is produced thereinside is n, as discussed above, by applying a potential to the first electrodes 331, an electric field is produced inside the base part 31 between the first electrodes 331 and the second electrode 341 and the direction of polarization of the first polarization parts 3111 becomes the (−Z) direction, and the refractive index of the first polarization part 3111 is thereby reduced by Δn to n−Δn. The direction of polarization of the second polarization parts 3112 becomes the (+Z) direction, and the refractive index of the second polarization part 3112 is thereby increased by Δn to n+Δn. This causes a periodic change in the refractive index in the polarization-part array direction between the first electrodes 331 and the second electrode 341 as shown in FIG. 5. In FIG. 5, the horizontal axis indicates a position in the X direction and the vertical axis indicates a refractive index. On the upper side of the graph, shown are the first polarization parts 3111 and the second polarization parts 3112 which are disposed at the respective positions in the X direction on the horizontal axis. In the optical modulator 3, by applying a potential to the plurality of first electrodes 331 of the first electrode portion 33, the periodic change in the refractive index in the polarization-part array direction is caused in the periodically-poled structure 310.

The light source part 21 shown in FIGS. 2 and 3 has a collimator lens (not shown), and the light beam emitted from the laser, going through the collimator lens, is changed to a parallel ray of light, entering a cylindrical lens 221. As to the light having passed through the cylindrical lens 221, the luminous flux section thereof perpendicular to the optical axis J1 gradually changes its shape from a circle to an ellipse elongated in the X direction. In other words, the cylindrical lens 221 has a negative power only in the X direction, and the width of the luminous flux section of the light having passed through the cylindrical lens 221 is (almost) constant in the Z direction perpendicular to the optical axis J1 and the X direction.

The light outgoing from the cylindrical lens 221 enters a cylindrical lens 222 having a positive power only in the X direction. As to the light having passed through the cylindrical lens 222, the luminous flux section thereof changes its shape to an ellipse elongated in the X direction, having a constant size. Then, the light enters a cylindrical lens 223. The cylindrical lens 223 has a positive power only in the Z direction, and when attention is paid only to the Z direction, the light having passed through the cylindrical lens 223 shown in FIG. 3 enters an end surface (hereinafter, referred to as a "light entrance surface") 313 on a (−Y) side of the base part 31 in the optical modulator 3 while being condensed. As to the X direction, the light outgoing from the cylindrical lens 223 shown in FIG. 2, becoming a parallel ray of light, enters the optical modulator 3. Thus, in the optical head 2, the cylindrical lenses 221 to 223 constitute an illumination optical system 22, and the illumination optical system 22 changes the light from the light source part 21 into a linear light beam spreading out in the X direction (i.e., a beam of which the shape of the luminous flux section is a line extending in the polarization-part array direction) and the linear light beam enters the inside of the base part 31 from the light entrance surface 313 of the base part 31 in the optical modulator 3.

The linear light beam having entered the inside of the base part 31 travels along the optical axis J1 (in other words, is guided along the traveling direction perpendicular to the polarization-part array direction) while being multiply reflected on the upper surface 311 and the lower surface 312 of the base part 31, which are parallel to each other, (i.e., the main surfaces 311 and 312 of which the normal is parallel to the Z direction), and goes through the periodically-poled structure 310. At that time, when attention is paid to one of the first electrodes 331 of the first electrode portion 33, in a state where no potential is applied to the first electrode 331 from the potential applying part 41 (i.e., a state where the potential of the first electrode 331 is the ground potential), the light out of the linear light beam parallel to the X direction, which goes through between the first electrode 331 and the second electrode 341 (i.e., which goes through the polarization pair group including the three polarization pairs 3110 corresponding to the first electrode 331), travels inside the base part 31 while being kept parallel to the X direction. Then, the light is guided to another end surface on a (+Y) side of the base part 31 (i.e., the other end surface opposite to the light entrance surface 313, and hereinafter, referred to as a "light exit surface") 314 and exits from the light exit surface 314 as a zeroth order light.

On the other hand, in a state where a potential is applied to the first electrode 331 from the potential applying part 41, a periodic change in the refractive index in the polarization-part array direction is caused between the first electrode 331 and the second electrode 341 by an electro optic effect, and a periodic phase difference is caused in the light out of the above linear light beam parallel to the X direction, which goes through the polarization pair group corresponding to the first electrode 331, to thereby cause diffraction. With this, the light out of the above linear light beam parallel to the X direction, which goes through between the first electrode 331 and the second electrode 341, exits as plus and minus first order diffracted lights which depart from the optical axis J1 in the X direction as the lights travel toward the (+Y) direction along the optical axis J1 (naturally, high-order diffracted lights also exit) from the light exit surface 314. In the first preferred embodiment, the periodically-poled structure 310 serves as a diffraction grating for causing Raman-Nath diffraction.

Thus, in the optical modulator 3, the light out of the above linear light beam, which goes through between the first electrode 331 and the second electrode 341 and exits from the light exit surface 314, is capable of transition between the zeroth order light and the plus and minus first order diffracted lights. In the optical head 2, the potential applying part 41 is controlled by the control part 4, and the potential is thereby applied individually to the plurality of first electrodes 331 of the first electrode portion 33. The lights going through a plurality of polarization pair groups corresponding to the plurality of first electrodes 331, respectively, are individually controlled and changed into the zeroth order lights or the plus and minus first order diffracted lights. Thus, the optical modulator 3 of the first preferred embodiment serves as a multichannel optical modulator.

The zeroth order lights from the optical modulator 3 are changed to the lights almost parallel to the Y direction by a cylindrical lens 231 having a positive power only in the Y direction and enter a lens 232 having a positive power, as the outline thereof is indicated by thin solid lines in FIG. 3. Herein, the front focal point of the lens 232 is a position inside the base part 31 near an end portion of the first electrode 331 on the (+Y) side, and at the rear focal point of the lens 232, an aperture of an aperture board 233 is located. Therefore, the zeroth order lights outgoing from the light exit surface 314 of the base part 31 are condensed to the aperture board 233 through the lens 232 and enter a lens 234 through the aperture of the aperture board 233, as the outline thereof is indicated by thin solid lines in FIG. 3.

The lens 234 is disposed so that the front focal point thereof is located near the aperture board 233 and the rear focal point thereof is located on the recording material 9 of the holding drum 70 (see FIG. 1). The zeroth order lights are emitted onto the recording material 9 while being condensed in the Z direction through the lens 234 to a position at which the optical axis J1 and the recording material 9 serving as an exposed surface are crossed.

The zeroth order lights having passed through five polarization pair groups corresponding to the five first electrodes 331 enter the lens 234 through the cylindrical lens 231, the lens 232, and the aperture of the aperture board 233 and are emitted onto the recording material 9 in parallel to the optical axis J1 through the lens 234 as shown in FIG. 2. In FIG. 2, the outline of the light from the light source part 21 is shown on the (−Y) side of the base part 31, and the centerline J2 of the luminous flux section of the zeroth order light having passed through the polarization pair group corresponding to each of the first electrodes 331 is shown on the (+Y) side of the base part 31.

On the other hand, the plus and minus first order diffracted lights having passed through the polarization pair group corresponding to each of the first electrodes 331 spread out in such a manner as to depart from each centerline J2 as the lights go further away from the base part 31 and are blocked by the aperture board 233, thereby not being emitted onto the recording material 9. In the optical head 2, the cylindrical lens 231, the aperture board 233, and the lenses 232 and 234 constitute a projection optical system 23 (which may be regarded as a Schlieren optical system serving as a both-side telecentric optical system).

Figure 6:
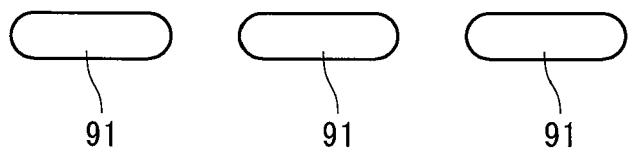
FIG. 6 is a view showing light irradiation regions on a recording material.

In a case, for example, where among the five first electrodes 331 of the first electrode portion 33, no potential is applied to the first, third, and fifth first electrodes 331 from the (+X) side and a predetermined potential is applied to the second and fourth first electrodes 331 from the (+X) side in the image recording apparatus 1, three irradiation regions 91 corresponding to the lights having passed through the polarization pair groups corresponding to the first, third, and fifth first electrodes 331 from the (+X) side are formed on the recording material 9 as shown in FIG. 6. In the optical modulator 3, in a process for obtaining the zeroth order light through the polarization pair group corresponding to each first electrode 331, the same potential (0V in the first preferred embodiment) is applied to the first electrode 331. Also in a process for obtaining the plus and minus first order diffracted lights, the same potential is applied to the first electrode 331.

Figure 7:
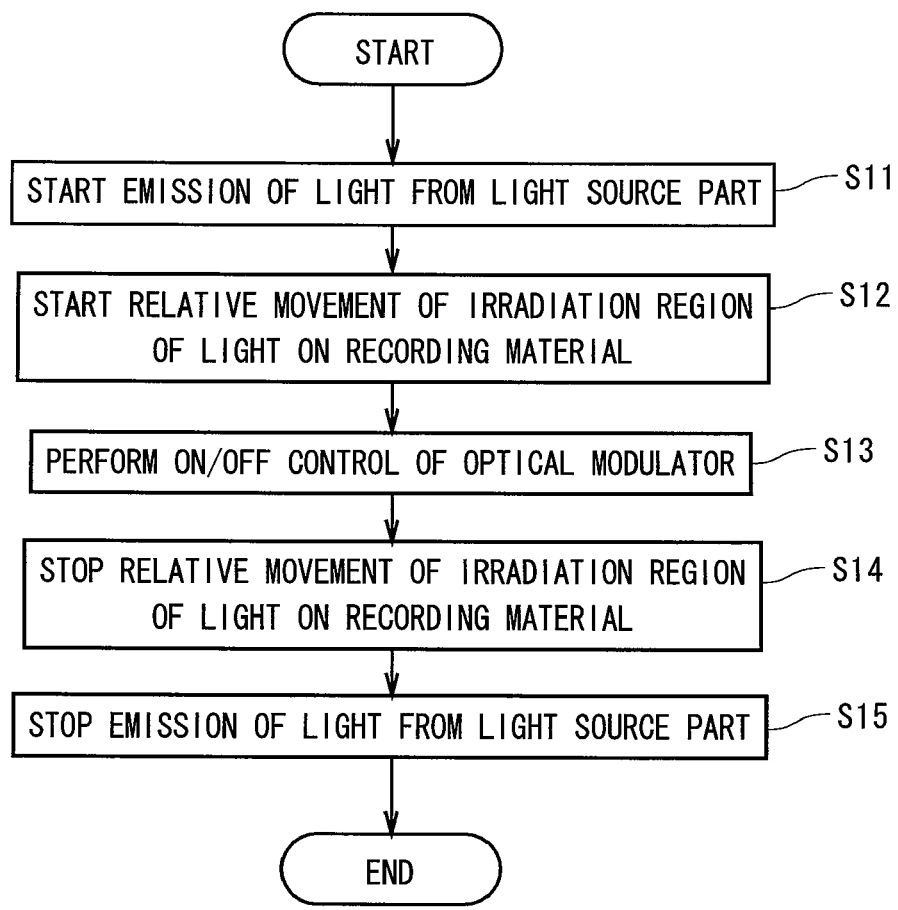
FIG. 7 is a flowchart showing an operation flow for recording an image on the recording material.

FIG. 7 is a flowchart showing an operation flow of the image recording apparatus 1 for recording an image on the recording material 9. In a process for recording an image, emission of light from the light source part 21 is first started (Step S11), and the optical head 2 is subsequently moved relatively to the recording material 9 in the main scan direction at a constant speed by rotation of the holding drum 70 and further moved in the subscan direction in synchronization with the rotation of the holding drum 70 (Step S12). The control part 4 performs ON/OFF control for switching between an On state where the light (i.e., the zeroth order light) from the base part 31 of the optical modulator 3 is guided to the recording material 9 and an OFF state where the light is not guided to the recording material 9 on each of the five first electrodes 331 of the first electrode portion 33 in synchronization with the movement of the irradiation region of light on the recording material 9 (i.e., the irradiation region of when it is assumed that the light form the optical modulator 3 is always guided to the recording material 9) relative to the recording material 9 (Step S13), to thereby record an image on the recording material 9. After the image is thus recorded on the entire recording material 9 while the irradiation region of the light from the optical head 2 is raster scanned, the rotation of the holding drum 70, the movement of the optical head 2 in the subscan direction, and the emission of light from the light source part 21 are stopped (Steps S14 and S15), and the operation of the image recording apparatus 1 for recording an image is completed.

As discussed above, in the optical modulator 3, the first electrode portion 33 is provided on the upper surface 311 of the base part 31 having the periodically-poled structure 310 and the second electrode portion 34 is provided on the lower surface 312 thereof, and by applying voltage between the first electrode portion 33 and the second electrode portion 34, a periodic change in the refractive index in the polarization-part array direction is caused in the periodically-poled structure 310 and the light entering the base part 31 is thereby diffracted. Thus, by applying voltage between the first electrode portion 33 and the second electrode portion 34 which are provided with the base part 31 interposed therebetween, a desired electric field in the Z direction can be produced inside the periodically-poled structure 310 while the voltage applied between the first electrode portion 33 and the second electrode portion 34 is reduced, unlike in the structure where a periodic change in the refractive index is caused in the base part by applying voltage between adjacent electrodes among a plurality of electrodes on the upper surface of the base part, which is disclosed in Japanese Patent Application Laid Open Gazette No. 2000-313141, the disclosure of which is herein incorporated by reference. Then, by reducing the voltage applied between the first electrode portion 33 and the second electrode portion 34, the rate of the optical modulation performed by the optical modulator 3 can be increased. In order to produce a desired electric field inside the periodically-poled structure 310, in the optical modulator 3, it is desirable that the thickness of the base part 31 should be not larger than 50 μm (more preferably, not larger than 30 μm).

In the optical modulator 3, by individually controlling the respective voltages applied to the polarization pair groups (each group including three successive polarization pairs 3110) in the periodically-poled structure 310 corresponding to the first electrodes 331 of the first electrode portion 33, it is possible to take a plurality of outgoing lights out from the incident light which is a linear light beam and individually control ON/OFF of the outgoing lights.

In the image recording apparatus 1, the pitch of the outgoing lights on the recording material 9, outgoing from the plurality of polarization pair groups corresponding to the plurality of first electrodes 331, (i.e., the distance between central axes of the luminous flux sections of the plurality of outgoing lights on the recording material 9, and hereinafter, referred to as "recording light pitch") is determined according to the polarization pair pitch in the periodically-poled structure 310. Therefore, in order to reduce the recording light pitch, it is necessary to reduce the polarization pair pitch, and accordingly, the pitch among the plurality of first electrodes 331 is reduced.

In such a structure where an electric field is produced inside the base part by applying voltage between the adjacent ones among a plurality of electrodes on the upper surface of the base part as disclosed in Japanese Patent Application Laid Open Gazette No. 2000-313141, if the pitch among the electrodes is reduced, a discharge is produced between the adjacent electrodes and it is therefore difficult to produce a desired electric field inside the base part.

In contrast to this structure, in the optical modulator 3 of the first preferred embodiment, the plurality of first electrodes 331 are provided on the upper surface 311 of the base part 31 and the second electrode 341 is provided on the lower surface 312 of the base part 31, and the respective voltages applied between the second electrode 341 and the plurality of first electrodes 331 are individually controlled and in the process for obtaining the zeroth order light or the plus and minus first order diffracted lights corresponding to each first electrode 331 from the light entering the base part 31, the same potential is applied to the first electrode 331. Since the pitch of the first electrodes 331 can be reduced while the discharge is prevented from being produced between the adjacent first electrodes 331, a high-density channel arrangement can be achieved. As a result, it is possible to achieve reduction of the recording light pitch (i.e., high definition of an image).

Thus, since the pitch of the plurality of first electrodes 331 of the first electrode portion 33 can be reduced in the optical modulator 3, the structure of the optical modulator 3 is particularly suitable for an optical modulator for modulating light from a light source in the image recording apparatus 1 which are required to record an image with high definition. In terms of higher definition in the image recording apparatus 1, it is desirable that the polarization pair pitch should be not larger than 10 μm.

In the optical modulator 3, the light entering the inside of the base part 31 from the light entrance surface 313 is guided toward the traveling direction parallel to the upper surface 311 and the lower surface 312 while being totally reflected on the upper surface 311 and the lower surface 312 repeatedly. It is thereby possible to guide the light entering the base part 31 from the light entrance surface 313 to the light exit surface 314 while suppressing the energy loss of the light.

Figure 8:
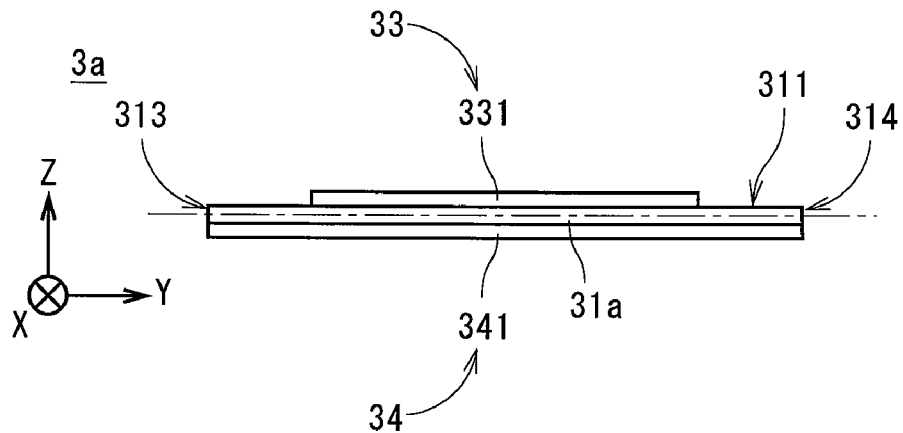
FIGS. 8 to 10 are views each showing another example of optical modulator.

FIG. 8 is a side view showing another exemplary optical modulator. In an optical modulator 3a of FIG. 8, the thickness of a base part 31a is thinner (e.g., 5 μm) than that of the base part 31 of FIG. 3, and light entering the base part 31a from the light entrance surface 313 is guided in the Y direction of FIG. 8 in a single mode. Like in the above-discussed optical modulator 3, when a potential is applied to the first electrode 331 on the upper surface 311, the plus and minus first order diffracted lights exit from the polarization pair group corresponding to the first electrode 331, and when no potential is applied to the first electrode 331, the zeroth order light exit. In the optical modulator 3a, by guiding the light in the base part 31a in a single mode, the intensity distribution of the light exiting from the light exit surface 314 in a direction perpendicular to the principal ray thereof can become a stable and desirable one (Gaussian distribution).

Further, in the optical modulator 3a, since the distance between the first electrode portion 33 and the second electrode portion 34 in the Z direction is smaller than that in the optical modulator 3 of FIG. 3, it is possible to further reduce the potential applied to the first electrode portion 33 (i.e., the voltage applied between the first electrode portion 33 and the second electrode portion 34) while keeping the intensity of the electric field produced between the first electrode portion 33 and the second electrode portion 34. On the other hand, in the optical modulator 3 of FIG. 3, since the light is guided in the base part 31 in a multimode, it is possible to propagate more energy of light.

Figure 9:
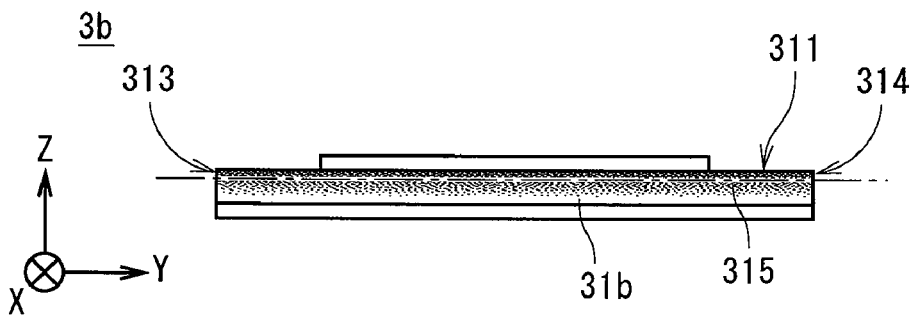
Figure 10:
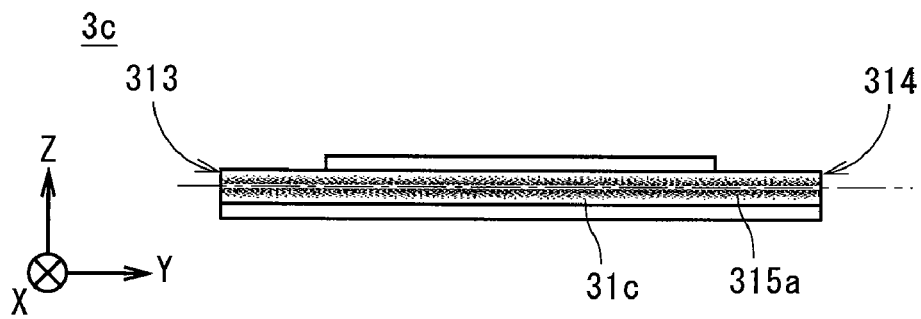

FIGS. 9 and 10 are side views showing still another exemplary optical modulators. In an optical modulator 3b of FIG. 9, an annealed/proton-exchanged waveguide 315 which is a slab waveguide (hereinafter, referred to simply as a "waveguide 315") is formed near the upper surface 311 of a base part 31b by the annealed proton exchange method. In the optical modulator 3b, since the light entering the inside of the base part 31b from the light entrance surface 313 exits from the light exit surface 314 only through the waveguide 315 of which the thickness (i.e., the size in the Z direction) is thinner than that of the base part 31b, it is possible to further reduce the energy loss of the light going through the base part 31b as compared with that in the base part 31 of FIG. 3.

In an optical modulator 3c of FIG. 10, a waveguide 315a is formed near the center of a base part 31c in the Z direction (the thickness direction). The base part 31c having the waveguide 315a is formed as follows. The waveguide is first formed near one of the main surfaces of an electro-optical crystal having a thickness half of that of the base part 31c by the annealed proton exchange method, and then the electro-optical crystal is superimposed on another electro-optical crystal having the same structure so that the main surface on which the waveguide is formed comes into contact therewith. In the optical modulator 3c, like in the optical modulator 3b of FIG. 9, since the light entering the inside of the base part 31c exits from the light exit surface 314 only through the waveguide 315a, it is possible to reduce the energy loss of the light going through the base part 31c. Further, by providing the waveguide 315a near the center of the base part 31c in the Z direction, it is possible to further reduce the energy loss of the light going through the base part 31c as compared with that in the optical modulator 3b of FIG. 9 since the waveform of the light propagating in the waveguide 315a is symmetrical in the Z direction (vertically symmetrical with respect to the centerline of the waveguide 315a).

Figure 11:
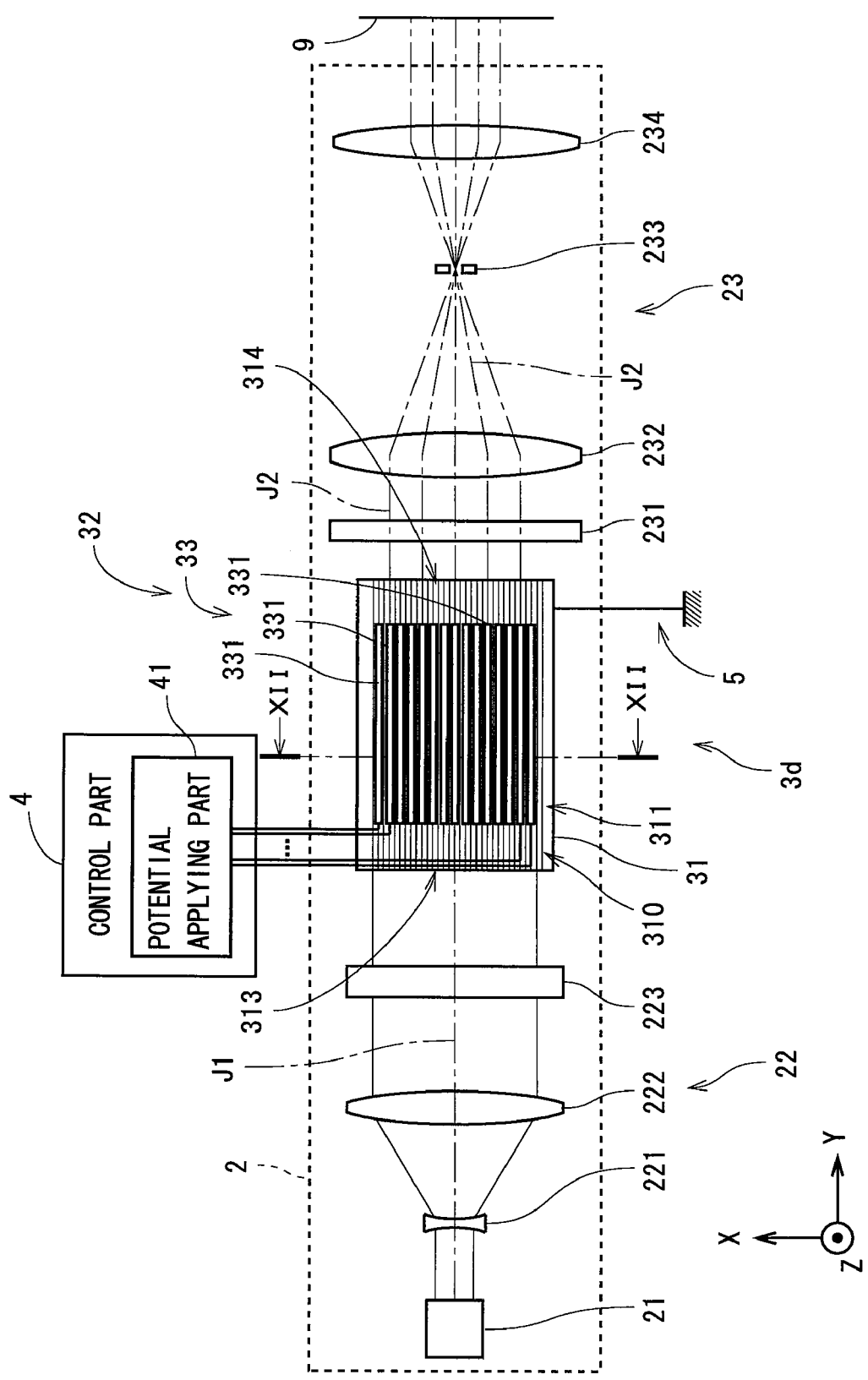
FIG. 11 is a view showing an internal configuration of an optical head in accordance with a second preferred embodiment.

Next, discussion will be made on an optical modulator in accordance with the second preferred embodiment of the present invention. FIG. 11 is a view showing an internal configuration of an optical head 2 in an image recording apparatus of the second preferred embodiment as viewed from the upper side (i.e., the (+Z) side). The optical head 2 of FIG. 11 has the same configuration as that of the optical head 2 shown in FIGS. 2 and 3 except that the shape and the arrangement of the first electrodes 331 of the first electrode portion 33 are different. In the following discussion, the corresponding constituent elements of the optical head 2 are represented by the same reference signs. The operation flow of the image recording apparatus for recording an image in the second preferred embodiment is the same as that in the first preferred embodiment.

The optical head 2 of FIG. 11 comprises the light source part 21 and an optical modulator 3d, and the optical modulator 3d comprises the base part 31 and the modulation part 32. As shown in FIG. 11, the modulation part 32 comprises the first electrode portion 33 provided on the upper surface 311 of the base part 31 and the second electrode portion 34 provided on the lower surface 312 of the base part 31 (see FIG. 12). The first electrode portion 33 comprises the plurality of strip-like first electrodes 331 arrayed in a predetermined electrode array direction (i.e., the X direction in FIG. 11), each extending in the Y direction which is the direction of the optical axis J1 (i.e., the traveling direction of light), and the plurality of first electrodes 331 are individually connected to the potential applying part 41 of the control part 4. Though an exemplary case where the first electrode portion 33 comprises fifteen first electrodes 331 will be discussed in the second preferred embodiment, actually, more number of first electrodes 331 are provided on the upper surface 311 of the base part 31.

Figure 12:
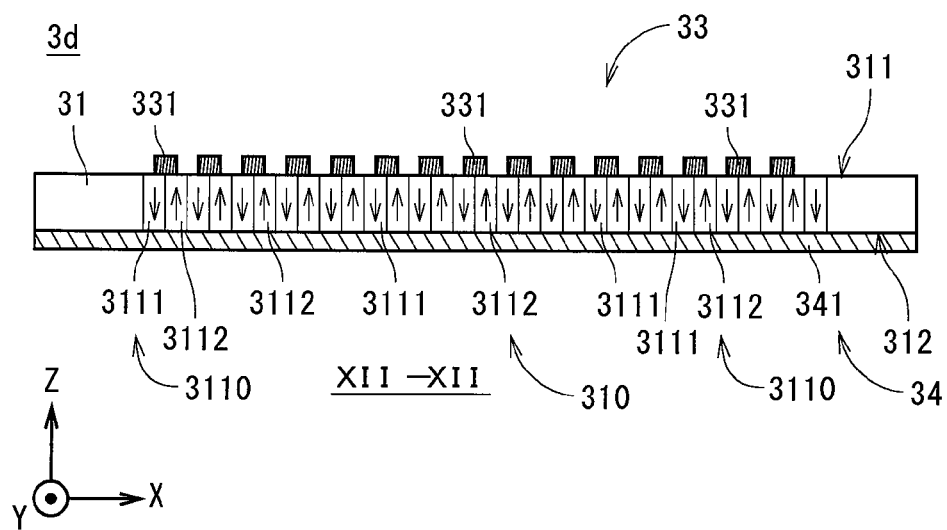
FIG. 12 is a cross section showing an optical modulator.

FIG. 12 is a cross section showing the optical modulator 3d, taken along the line XII-XII of FIG. 11. As shown in FIG. 12, the second electrode portion 34 comprises the single second electrode 341 (i.e., a common electrode) opposed to the plurality of first electrodes 331 of the first electrode portion 33 with the base part 31 interposed therebetween and is connected to the grounding part 5 (see FIG. 11) for applying a ground potential. Like in the first preferred embodiment, the base part 31 has the periodically-poled structure 310 in which the plurality of first polarization parts 3111 and the plurality of second polarization parts 3112 are alternately arranged in the predetermined polarization-part array direction (i.e., the X direction of FIG. 12, which is a direction parallel to the above-discussed electrode array direction).

The first electrode portion 33 and the second electrode portion 34 are arranged with the periodically-poled structure 310 of the base part 31 interposed therebetween. Each of the first electrodes 331 of the first electrode portion 33 is disposed on a polarization part group including one first polarization part 3111 and one second polarization part 3112 which are arranged successively in the polarization-part array direction (i.e., one polarization pair 3110).

In the optical modulator 3d, by applying a positive (+) potential (e.g., 2V to 25V) to the first electrodes 331 of the first electrode portion 33 from the potential applying part 41 (see FIG. 11) (in other words, by applying voltage of the Z direction between the first electrode portion 33 and the second electrode portion 34), the direction of polarization of the first polarization part 3111 becomes the (−Z) direction and the direction of polarization of the second polarization part 3112 becomes the (+Z) direction in the polarization part group corresponding to one first electrode 331. In FIG. 12, the direction of polarization of each polarization part is represented by an arrow.

In the optical head 2 of FIG. 11, like in the first preferred embodiment, the cylindrical lenses 221 to 223 constitute the illumination optical system 22, and the illumination optical system 22 changes the light from the light source part 21 into linear light beam spreading out in the X direction (i.e., extending in the polarization-part array direction) and the linear light beam enters the inside of the base part 31 from the light entrance surface 313 of the base part 31 in the optical modulator 3d.

The linear light beam having entered the inside of the base part 31 travels along the optical axis J1 (in other words, is guided along the traveling direction perpendicular to the polarization-part array direction) while being multiply reflected on the upper surface 311 and the lower surface 312 (see FIG. 12) of the base part 31, which are parallel to each other, and goes through the periodically-poled structure 310. In the optical modulator 3d, control is so made as to apply the same potential to each group of three first electrodes 331 arranged successively in the electrode array direction (hereinafter, referred to as a "first electrode group"). When attention is paid to one first electrode group (i.e., the three successive first electrodes 331), in a state where no potential is applied to the first electrode group from the potential applying part 41 (i.e., a state where the potential of the three first electrodes 331 in the first electrode group is the ground potential), the light out of the linear light beam parallel to the X direction, which goes through between the first electrode group and the second electrode 341 (i.e., which goes through the three polarization part groups (polarization pairs 3110) corresponding to the first electrode group), travels inside the base part 31 while being kept parallel to the X direction. Then, the light is guided to the light exit surface 314 of the base part 31 on the (+Y) side and exits from the light exit surface 314 as the zeroth order light.

On the other hand, in a state where a potential is applied to one first electrode group from the potential applying part 41, a periodic change in the refractive index in the polarization-part array direction is caused between the first electrode group and the second electrode 341 by the electro optic effect, and a periodic phase difference is caused in the light out of the above linear light beam parallel to the X direction, which goes through the three polarization part groups corresponding to the first electrode group, to thereby cause diffraction. In other words, a portion of the periodically-poled structure 310 between the first electrode group and the second electrode 341 serves as a phase diffraction grating. With this, the light out of the above linear light beam parallel to the X direction, which goes through between the first electrode group and the second electrode 341, exits as the plus and minus first order diffracted lights which depart from the optical axis J1 in the X direction as the lights travel toward the (+Y) direction along the optical axis J1 (naturally, high-order diffracted light also exit) from the light exit surface 314. In the second preferred embodiment, the periodically-poled structure 310 serves as the diffraction grating for causing Raman-Nath diffraction.

Thus, in the optical modulator 3d, the light out of the above linear light beam, which goes through between the first electrode group and the second electrode 341 and exits from the light exit surface 314, is capable of transition between the zeroth order light and the plus and minus first order diffracted lights. In the optical head 2, the potential applying part 41 is controlled by the control part 4, and the potential is thereby applied individually to a plurality of first electrode groups (five in the second preferred embodiment) of the first electrode portion 33. The light going through three polarization part groups corresponding to each first electrode group is controlled independently from other lights each going through three polarization part groups corresponding to one of other first electrode groups and changed into the zeroth order light or the plus and minus first order diffracted lights. Thus, the optical modulator 3d of the second preferred embodiment serves as a multichannel optical modulator.

The zeroth order lights having passed between the five first electrode groups and the second electrode 341 in the light modulator 3d enter the lens 234 through the cylindrical lens 231, the lens 232, and the aperture of the aperture board 233 and are emitted onto the recording material 9 in parallel to the optical axis J1 through the lens 234 like in the first preferred embodiment. In FIG. 11, the outline of the light from the light source part 21 is shown on the (−Y) side of the base part 31, and the centerline J2 of the luminous flux section of the zeroth order light having passed between each first electrode group and the second electrode 341 is shown on the (+Y) side of the base part 31.

On the other hand, the plus and minus first order diffracted lights having passed between each first electrode group and the second electrode 341 spread out in such a manner as to depart from each centerline J2 as the lights go further away from the base part 31 and are blocked by the aperture board 233, thereby not being emitted onto the recording material 9. In the optical head 2, the cylindrical lens 231, the aperture board 233, and the lenses 232 and 234 constitute the projection optical system 23 (which may be regarded as a Schlieren optical system serving as a both-side telecentric optical system).

In a case, for example, where among the five first electrode groups, no potential is applied to the first, third, and fifth first electrode groups from the (+X) side and a predetermined potential is applied to the second and fourth first electrode groups from the (+X) side in the image recording apparatus of the second preferred embodiment, three irradiation regions 91 corresponding to the respective lights having passed between the second electrode 341 and the first, third, and fifth first electrode groups from the (+X) side are formed on the recording material 9 like in the case shown in FIG. 6. In the optical modulator 3d, in the process for obtaining the zeroth order light through the three polarization part groups (polarization pairs 3110) corresponding to each first electrode group, the same potential (0V in the second preferred embodiment) is applied to each first electrode group. Also in the process for obtaining the plus and minus first order diffracted lights, the same potential is applied to each first electrode group.

As discussed above, in the optical modulator 3d of FIG. 12, the first electrode portion 33 is provided on the upper surface 311 of the base part 31 having the periodically-poled structure 310 and the second electrode portion 34 is provided on the lower surface 312 thereof, and by applying voltage between the first electrode portion 33 and the second electrode portion 34, a periodic change in the refractive index in the polarization-part array direction is caused in the periodically-poled structure 310 and the light entering the base part 31 is thereby diffracted. Thus, by applying voltage between the first electrode portion 33 and the second electrode portion 34 which are provided with the base part 31 interposed therebetween, a desired electric field in the Z direction can be produced inside the periodically-poled structure 310 while the voltage applied between the first electrode portion 33 and the second electrode portion 34 is reduced, unlike in the structure where a periodic change in the refractive index is caused in the base part by applying voltage between adjacent electrodes among a plurality of electrodes on the upper surface of the base part, which is disclosed in Japanese Patent Application Laid Open Gazette No. 2000-313141. Then, by reducing the voltage applied between the first electrode portion 33 and the second electrode portion 34, the rate of the optical modulation performed by the optical modulator 3d can be increased. In order to produce a desired electric field inside the periodically-poled structure 310, in the optical modulator 3d, it is desirable that the thickness of the base part 31 should be not larger than 50 μm (more preferably, not larger than 30 μm).

In the optical modulator 3d, by controlling the voltage applied to the three polarization part groups (i.e., the three successive polarization pairs) in the periodically-poled structure 310 corresponding to each first electrode group of the first electrode portion 33 independently from other voltages each applied to the three polarization part groups corresponding to one of the other first electrode groups, it is possible to take a plurality of outgoing lights out from the incident light which is a linear light beam and individually control ON/OFF of the outgoing lights.

In the image recording apparatus of the second preferred embodiment, the recording light pitch of the plurality of outgoing lights on the recording material 9, having passed between the plurality of first electrode groups and the second electrode 341, is determined according to the polarization pair pitch of the periodically-poled structure 310. Therefore, in order to reduce the recording light pitch, it is necessary to reduce the polarization pair pitch, and accordingly, the pitch among the plurality of first electrodes 331 is reduced.

In such a structure where an electric field is produced inside the base part by applying voltage between the adjacent electrodes among a plurality of electrodes on the upper surface of the base part as disclosed in Japanese Patent Application Laid Open Gazette No. 2000-313141, if the pitch among the electrodes is reduced, a discharge is produced between the adjacent electrodes and it is therefore difficult to produce a desired electric field inside the base part.

In contrast to this structure, in the optical modulator 3d of the second preferred embodiment, the plurality of first electrodes 331 are provided on the upper surface 311 of the base part 31 and the second electrode 341 is provided on the lower surface 312 of the base part 31, and the respective voltages applied between the second electrode 341 and the plurality of first electrodes 331 are individually controlled and the same potential is applied to the first electrode groups in the process for obtaining the zeroth order light or the plus and minus first order diffracted lights corresponding to each first electrode group from the light entering the base part 31. Since the distance of the first electrode groups (i.e., the pitch among the first electrodes 331) can be reduced while the discharge is prevented from being produced between the adjacent first electrodes 331, a high-density channel arrangement can be achieved. As a result, it is possible to achieve reduction of the recording light pitch (i.e., high definition of an image).

Thus, since the pitch of the plurality of first electrodes 331 of the first electrode portion 33 can be reduced in the optical modulator 3d, the structure of the optical modulator 3d is particularly suitable for an optical modulator for modulating light from a light source in the image recording apparatus 1 which are required to record an image with high definition. In terms of higher definition in the image recording apparatus 1, it is desirable that the polarization pair pitch should be not larger than 10 μm.

In the optical modulator 3d, the light entering the inside of the base part 31 from the light entrance surface 313 is guided toward the traveling direction parallel to the upper surface 311 and the lower surface 312 while being totally reflected on the upper surface 311 and the lower surface 312 repeatedly. It is thereby possible to guide the light entering the base part 31 from the light entrance surface 313 to the light exit surface 314 while suppressing the energy loss of the light.

As discussed above, the optical modulator 3d has a configuration in which the plurality of first electrodes 331 each provided on one of the polarization pairs 3110 are individually connected to the potential applying part 41 and a potential is applied individually to the plurality of first electrodes 331 (in other words, the potential applied to each first electrode 331 can be controlled independently from the potentials applied to the other first electrodes 331). Therefore, by changing the control over the potential applying part 41 by the control part 4, it is possible to easily change the number of first electrodes 331 arranged successively in the electrode array direction, to which the same potential is always applied (in other words, the number of first electrodes 331 included in one first electrode group).

With such control that four first electrodes 331 arranged successively in the electrode array direction constitute one first electrode group, for example, the length of an irradiation region on the recording material 9 in the X direction that is formed by the light having passed between the first electrode group and the second electrode 341 and having been guided to the recording material 9 can be increased to 4/3 as compared with the case where one first electrode group consists of three first electrodes 331. With such control that five first electrodes 331 arranged successively in the electrode array direction constitute one first electrode group, the length of an irradiation region on the recording material 9 in the X direction can be increased to 5/3 as compared with the case where one first electrode group consists of three first electrodes 331.

In such an optical modulator that has a structure in which the number of first electrodes included in the first electrode group cannot be changed, in order to increase the length of an irradiation region on the recording material 9 in the X direction, it is necessary to bring the outgoing light corresponding to two adjacent first electrode groups into an ON state (in other words, to apply no potential to six first electrodes 331 included in the two first electrode groups) and the length of the irradiation region on the recording material 9 in the X direction increases to twice the length in the case where the outgoing light corresponding to one first electrode group is brought into an ON state.

In contrast to this structure, as discussed above, since the number of first electrodes 331 included in one first electrode group can be easily changed in the optical modulator 3d of the second preferred embodiment, the unit of change for the length of the irradiation region on the recording material 9 in the X direction can be made smaller (in other words, the address resolution can be increased). In the optical modulator 3d, the control pitch can be reduced.

Figure 13:
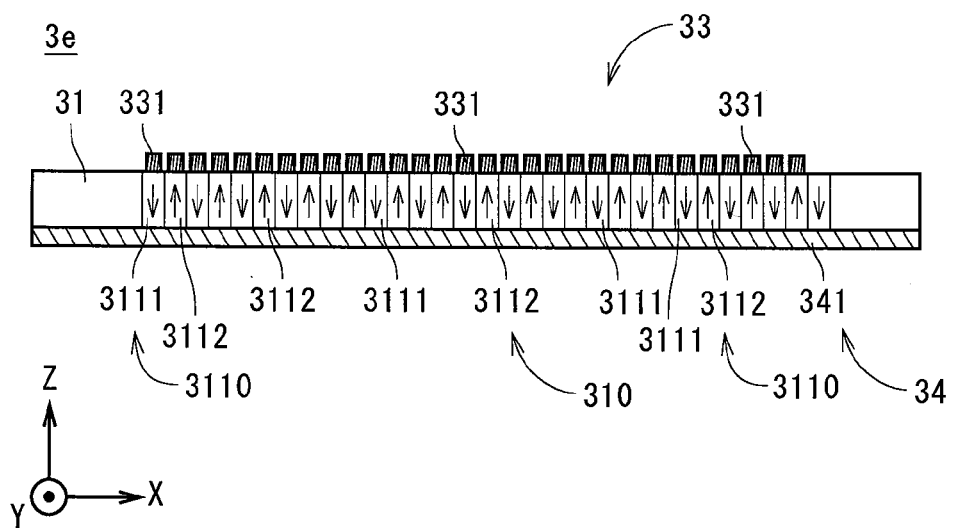
FIG. 13 is a cross section showing an optical modulator in accordance with a third preferred embodiment.

Next, discussion will be made on an optical modulator in accordance with the third preferred embodiment of the present invention. FIG. 13 shows a cross section of an optical modulator 3e in a direction perpendicular to the Y direction in accordance with the third preferred embodiment, which corresponds to FIG. 12 showing a cross section of the optical modulator 3d in accordance with the second preferred embodiment. As shown in FIG. 13, the optical modulator 3e has the same configuration as that of the optical modulator 3d shown in FIGS. 11 and 12 except that the shape and the arrangement of the first electrodes 331 of the first electrode portion 33 are different from those in the optical modulator 3d of FIG. 12. In the following discussion, constituent elements of the optical modulator 3e which correspond to those in the optical modulator 3d are represented by the same reference signs.

In the first electrode portion 33 of the optical modulator 3e shown in FIG. 13, thirty strip-like first electrodes 331 each extending in the Y direction are arrayed in the X direction which is the electrode array direction, and each of the first electrodes 331 is disposed on one first polarization part 3111 or one second polarization part 3112. The plurality of first electrodes 331 are individually connected to the potential applying part 41 of the control part 4 (see FIG. 11). In the optical modulator 3e, six first electrodes 331 arranged successively in the electrode array direction constitute a first electrode group which is controlled to always have the same potential.

Like in the second preferred embodiment, in the optical modulator 3e, it is possible to produce a desired electric field in the Z direction inside the periodically-poled structure 310 while reducing the voltage applied between the first electrode portion 33 and the second electrode portion 34. Further, by controlling the voltage applied to the six polarization parts (i.e., three successive polarization pairs 3110) in the periodically-poled structure 310 corresponding to each first electrode group of the first electrode portion 33 independently from other voltages each applied to the six polarization parts corresponding to one of the other first electrode groups, it is possible to take a plurality of outgoing lights out from the incident light which is a linear light beam and individually control ON/OFF of the outgoing lights. In the process for obtaining the zeroth order light or the plus and minus first order diffracted lights corresponding to each first electrode group from the light entering the base part 31, by applying the same potential to the first electrode group, it is possible to reduce the distance between the first electrode groups (in other words, reduce the pitch of the first electrodes 331) while preventing the discharge from being produced between the adjacent first electrode groups. As a result, it is possible to achieve reduction of the recording light pitch (i.e., high definition of an image).

As discussed above, the optical modulator 3e has a configuration in which the plurality of first electrodes 331 each provided on one polarization part are individually connected to the potential applying part 41 and a potential is applied individually to the plurality of first electrodes 331 (in other words, the potential applied to each first electrode 331 can be controlled independently from the potentials applied to the other first electrodes 331). Therefore, by changing the control over the potential applying part 41 by the control part 4, it is possible to easily change the number of first electrodes 331 arranged successively in the electrode array direction, to which the same potential is always applied (in other words, the number of first electrodes 331 included in one first electrode group).

With such control that seven first electrodes 331 arranged successively in the electrode array direction constitute one first electrode group, for example, the length of an irradiation region on the recording material 9 in the X direction that is formed by the light having passed between the first electrode group and the second electrode 341 and having been guided to the recording material 9 can be increased to 7/6 as compared with the case where one first electrode group consists of six first electrodes 331. With such control that eight first electrodes 331 arranged successively in the electrode array direction constitute one first electrode group, the length of an irradiation region on the recording material 9 in the X direction can be increased to 4/3 as compared with the case where one first electrode group consists of six first electrodes 331. Thus, in the optical modulator 3e, the unit of change for the length of the irradiation region on the recording material 9 in the X direction can be made smaller (in other words, the address resolution can be increased). In the optical modulator 3e, the control pitch can be reduced.

Figure 14:
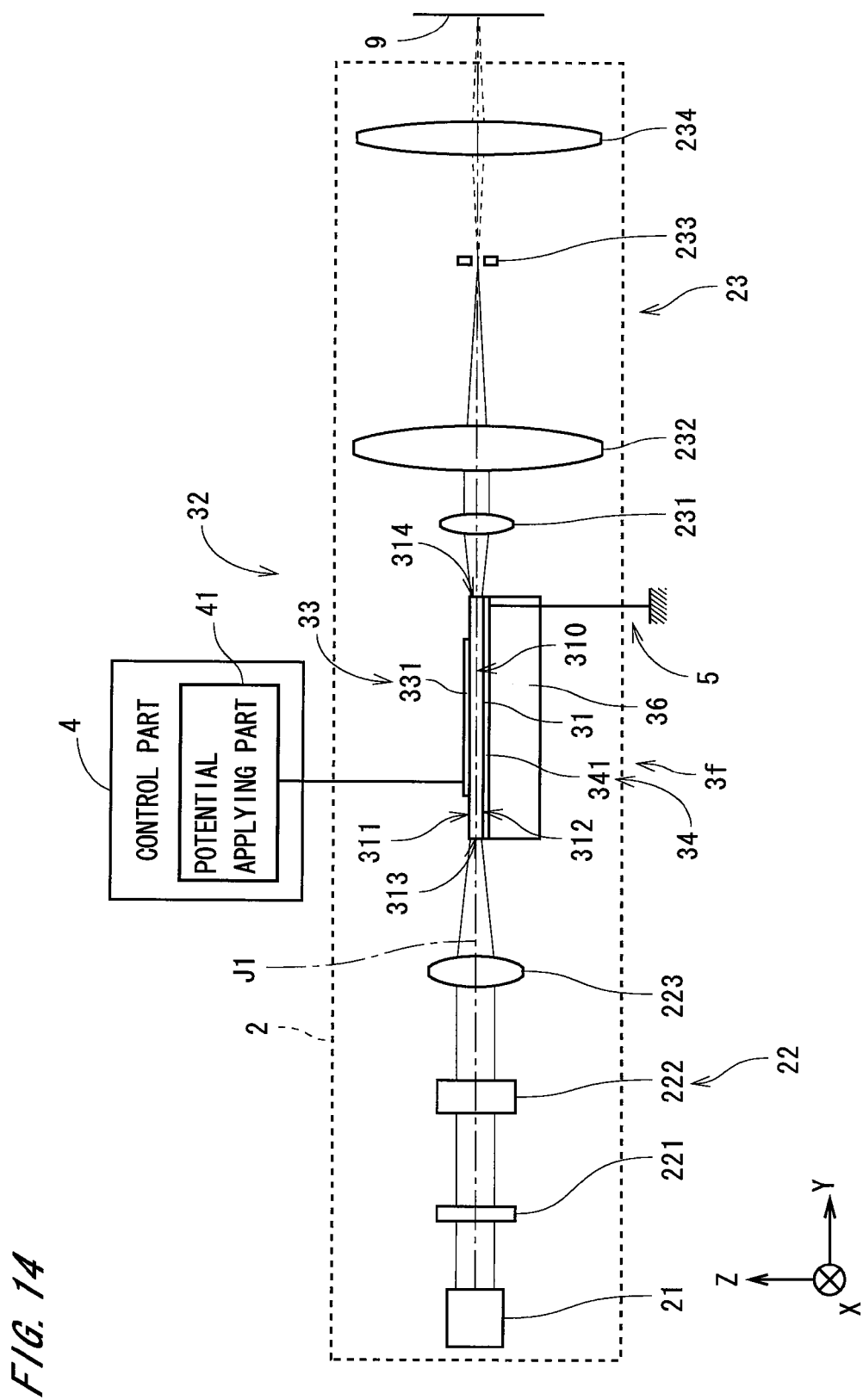
FIG. 14 is a view showing an internal configuration of an optical head in accordance with a fourth preferred embodiment.

Next, discussion will be made on an optical modulator in accordance with the fourth preferred embodiment of the present invention. FIG. 14 is a view showing an internal configuration of an optical head 2 of an image recording apparatus in accordance with the fourth preferred embodiment as viewed from the (−X) side toward the (+X) side. The optical head 2 of FIG. 14 has the same configuration as that of the optical head 2 shown in FIGS. 2 and 3 except that an optical modulator 3f comprises a supporting member 36. In the following discussion, the corresponding constituent elements of the optical head 2 are represented by the same reference signs. The operation flow of the image recording apparatus for recording an image in the fourth preferred embodiment is the same as that in the first preferred embodiment.

The optical head 2 of FIG. 14 comprises the light source part 21 and an optical modulator 3f, and the optical modulator 3f comprises the base part 31 and the modulation part 32. The modulation part 32 comprises the first electrode portion 33 provided on the upper surface 311 of the base part 31 and the second electrode portion 34 provided on the lower surface 312 of the base part 31. The first electrode portion 33 comprises the plurality of strip-like first electrodes 331 arrayed in a predetermined electrode array direction (i.e., the X direction in FIG. 14), each extending in the Y direction which is the direction of the optical axis J1 (i.e., the traveling direction of light) (see FIG. 2), and the plurality of first electrodes 331 are individually connected to the potential applying part 41 of the control part 4. Though an exemplary case where the first electrode portion 33 comprises five first electrodes 331 will be discussed in the fourth preferred embodiment like in the first preferred embodiment, actually, more number of first electrodes 331 are provided on the upper surface 311 of the base part 31. The second electrode portion 34 comprises the single second electrode 341 (i.e., a common electrode) opposed to the plurality of first electrodes 331 of the first electrode portion 33 with the base part 31 interposed therebetween and is connected to the grounding part 5 for applying a ground potential.

The optical modulator 3f further comprises the supporting member 36 provided below the second electrode portion 34 (on a side of the second electrode portion 34 opposite to the base part 31), being in contact with the second electrode 341. The supporting member 36 overlaps the whole of the first electrode portion 33, the base part 31, and the second electrode portion 34 in a plan view and supports the first electrode portion 33, the base part 31, and the second electrode portion 34 from below. The thickness of the supporting member 36 in the Z direction is larger than that of the base part 31. In the fourth preferred embodiment, the thickness of the supporting member 36 ranges from 0.5 mm to 5 mm and that of the base part 31 ranges from 20 μm to 30 μm.

The supporting member 36 is formed of the same material as the base part 31, i.e., lithium niobate in the fourth preferred embodiment. It is preferable, however, that the base part 31 should be formed of lithium niobate doped with magnesium oxide (MgO) or stoichiometry lithium niobate in order to reduce the energy loss of the light going therethrough, but it is preferable that the supporting member 36 should be formed of normal (congruent) lithium niobate not doped with magnesium oxide or SAW grade lithium niobate in order to reduce the manufacturing cost of the optical modulator 3f.

Figure 15:
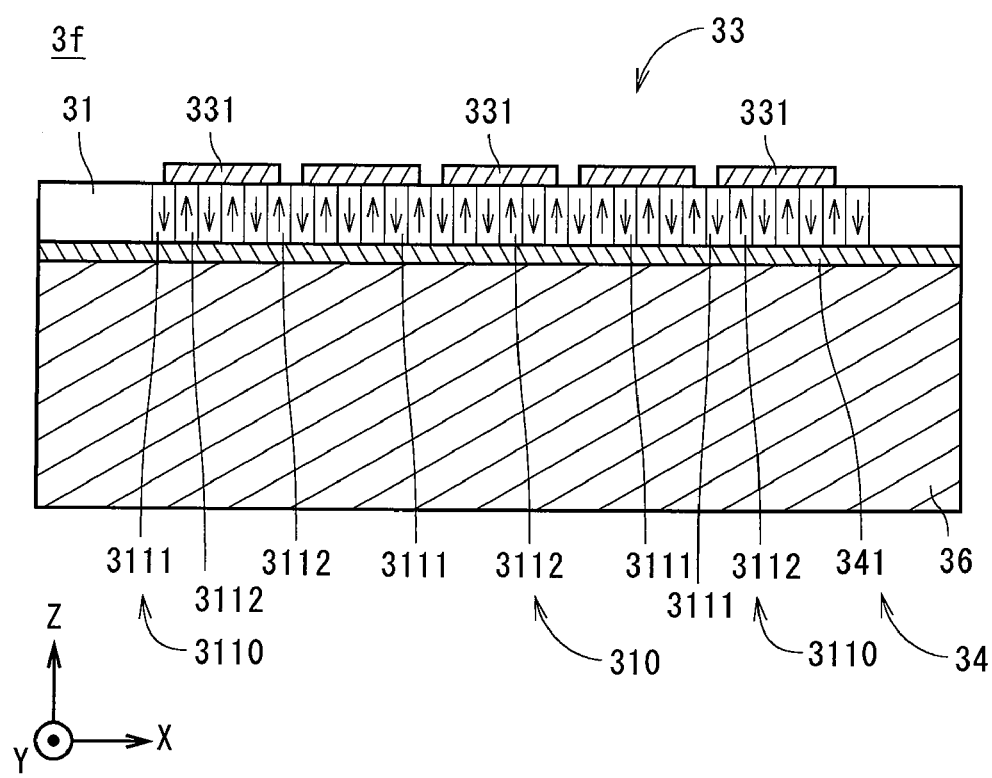
FIG. 15 is a cross section showing an optical modulator.

FIG. 15 shows a cross section of the optical modulator 3f in a direction perpendicular to the Y direction, which corresponds to FIG. 4 showing a cross section of the optical modulator 3 in accordance with the first preferred embodiment. As shown in FIG. 15, like in the first preferred embodiment, the base part 31 has the periodically-poled structure 310 in which the plurality of first polarization parts 3111 and the plurality of second polarization parts 3112 are alternately arranged in a polarization-part array direction (i.e., in the X direction of FIG. 15, which is a direction parallel to the above-discussed electrode array direction).

The first electrode portion 33 and the second electrode portion 34 are arranged with the periodically-poled structure 310 of the base part 31 interposed therebetween. Each of the first electrodes 331 of the first electrode portion 33 is disposed on a polarization pair group including three polarization pairs 3110 arranged successively in the polarization-part array direction.

In the optical modulator 3f, by applying a positive (+) potential (e.g., 2V to 25V) to the first electrodes 331 of the first electrode portion 33 from the potential applying part 41 (see FIG. 14) (in other words, by applying voltage of the Z direction between the first electrode portion 33 and the second electrode portion 34), the direction of polarization of the three first polarization parts 3111 becomes the (−Z) direction and the direction of polarization of the three second polarization parts 3112 becomes the (+Z) direction in the polarization pair group corresponding to one first electrode 331. In FIG. 15, the direction of polarization of each polarization part is represented by an arrow.

In the optical head 2 of FIG. 14, like in the first preferred embodiment, the cylindrical lenses 221 to 223 constitute the illumination optical system 22, and the illumination optical system 22 changes the light from the light source part 21 into linear light beam spreading in the X direction (i.e., extending in the polarization-part array direction) and the linear light beam enters the inside of the base part 31 from the light entrance surface 313 of the base part 31 in the optical modulator 3f.

The linear light beam having entered the inside of the base part 31 travels along the optical axis J1 (in other words, is guided along the traveling direction perpendicular to the polarization-part array direction) while being multiply reflected on the upper surface 311 and the lower surface 312 of the base part 31, which are parallel to each other, (i.e., the main surfaces 311 and 312 of which the normal is parallel to the Z direction), and goes through the periodically-poled structure 310.

In the optical modulator 3f shown in FIGS. 14 and 15, like in the first preferred embodiment, the light out of the above linear light beam, which goes through between the first electrode 331 and the second electrode 341 and exits from the light exit surface 314, is capable of transition between the zeroth order light and the plus and minus first order diffracted lights. In the optical head 2, the potential applying part 41 is controlled by the control part 4 shown in FIG. 14, and the potential is thereby applied individually to the plurality of first electrodes 331 of the first electrode portion 33. The lights going through a plurality of polarization pair groups corresponding to the plurality of first electrodes 331, respectively, are individually controlled and changed into the zeroth order lights or the plus and minus first order diffracted lights. Thus, the optical modulator 3f of the fourth preferred embodiment serves as a multichannel optical modulator.

The zeroth order lights having passed through five polarization pair groups corresponding to the five first electrodes 331 enter the lens 234 through the cylindrical lens 231, the lens 232, and the aperture of the aperture board 233 and are emitted onto the recording material 9 in parallel to the optical axis J1 through the lens 234 like in the first preferred embodiment.

On the other hand, the plus and minus first order diffracted lights having passed through the polarization pair group corresponding to each of the first electrodes 331 spread out as the lights go further away from the base part 31 and are blocked by the aperture board 233, thereby not being emitted onto the recording material 9. In the optical head 2, the cylindrical lens 231, the aperture board 233, and the lenses 232 and 234 constitute the projection optical system 23 (which may be regarded as a Schlieren optical system serving as a both-side telecentric optical system).

In the optical modulator 3f, in the process for obtaining the zeroth order light through the polarization pair group corresponding to each first electrode 331, the same potential (0V in the fourth preferred embodiment) is applied to the first electrode 331. Also in the process for obtaining the plus and minus first order diffracted lights, the same potential is applied to the first electrode 331.

Figure 16:
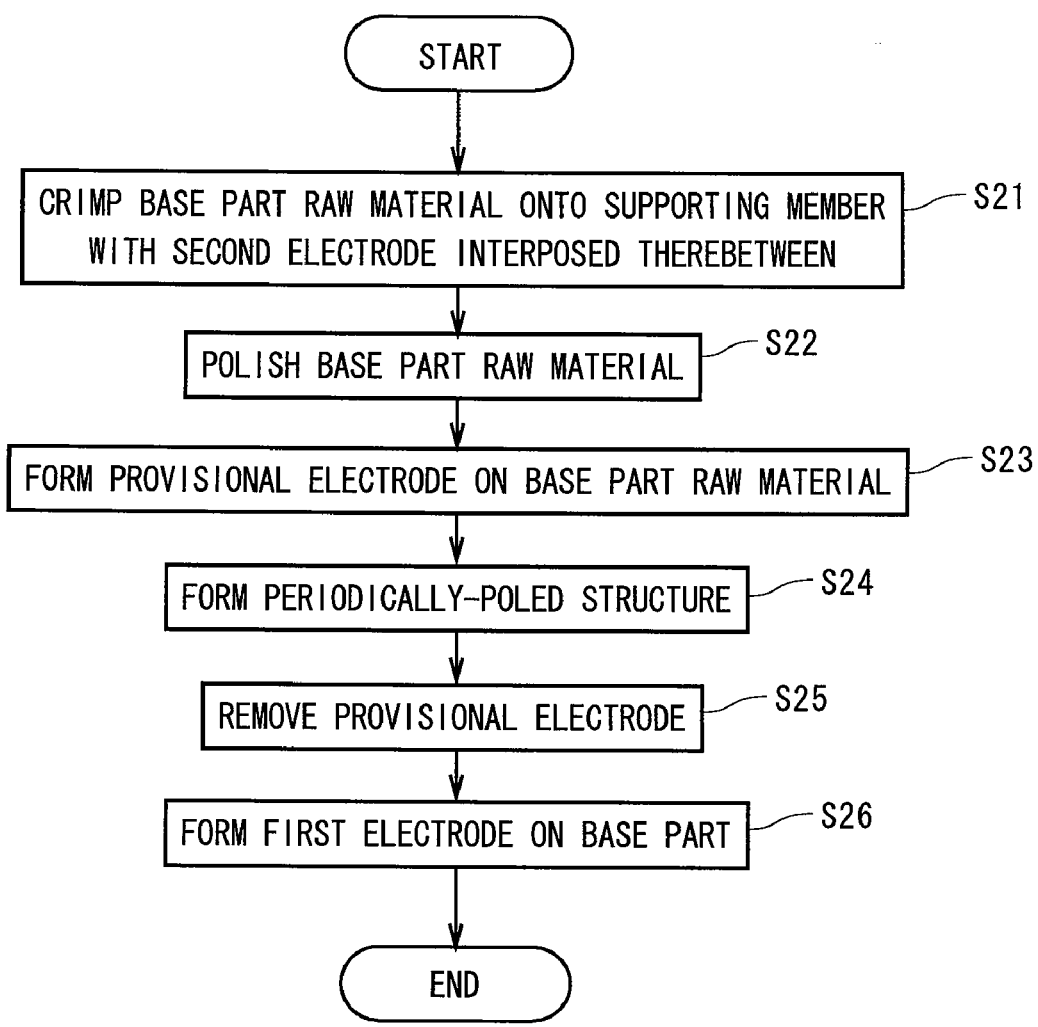
FIG. 16 is a flowchart showing an operation flow for manufacturing the optical modulator.

FIG. 16 is a flowchart showing an operation flow for manufacturing the optical modulator 3f. In a process for manufacturing the optical modulator 3f, first, an underlying layer is formed on the lower surface of a material (hereinafter, referred to as a "base part raw material") to become the base part 31 of lithium niobate by evaporation of chromium (Cr), and gold (Au) is evaporated onto the lower surface of the underlying layer. Further, an underlying layer is formed on the upper surface of the supporting member 36 (see FIGS. 14 and 15) of lithium niobate by evaporation of chromium, and gold is evaporated onto the upper surface of the underlying layer. The thickness of the base part raw material ranges about 0.15 mm to 0.5 mm.

Subsequently, by crimping the gold layer (of which the thickness ranges 3 μm to 5 μm) formed on the lower surface of the base part raw material and the gold layer (of which the thickness ranges 3 μm to 5 μm) formed on the upper surface of the supporting member 36 (in other words, by metallically bonding these gold layers), the second electrode 341 of gold in the second electrode portion 34 is formed between the base part raw material and the supporting member 36 (Step S21). The base part raw material is polished from the upper surface side until it has a desired thickness (20 μm to 30 μm) (Step S22).

Next, a plurality of provisional electrodes are formed, extending in the Y direction perpendicular to the polarization-part array direction, at a position on the upper surface of the base part raw material where the plurality of first polarization parts 3111 of the periodically-poled structure 310 are to be formed (Step S23). The plurality of provisional electrodes are formed by, for example, forming a material layer of the provisional electrodes on the upper surface of the base part raw material and performing patterning by photolithography or the like on the layer. Then, by applying very high voltage (not lower than the poling voltage of lithium niobate) between each provisional electrode and the second electrode 341, the direction of polarization at the portion to become the first polarization part 3111 is reversed, to thereby form the periodically-poled structure 310 (Step S24).

After the base part 31 of predetermined thickness having the periodically-poled structure 310 is formed from the base part raw material, the plurality of provisional electrodes on the base part 31 are removed (Step S25) and the plurality of first electrodes 331 are provided on the upper surface of the base part 31, and the process for manufacturing the optical modulator 3f is completed (Step S26). The plurality of first electrodes 331 may be formed by, for example, the same method as that of forming the provisional electrodes (by photolithography). Alternatively, the first electrodes 331 may be provided on the base part 31 by layering a wiring board in which the first electrodes 331 are formed on a silicon substrate, on the upper surface of the base part 31 in such a manner as to cause the first electrodes 331 to face the base part 31. At that time, an optical element such as a coupling prism or the like for guiding light toward the light entrance surface 313 of the base part 31 may be incorporated into the base part 31 together with the above wiring board.

As discussed above, in the optical modulator 3f, like in the first preferred embodiment, it is possible to produce a desired electric field in the Z direction inside the periodically-poled structure 310 while reducing the voltage applied between the first electrode portion 33 and the second electrode portion 34. Then, by reducing the voltage applied between the first electrode portion 33 and the second electrode portion 34, the rate of the optical modulation performed by the optical modulator 3f can be increased.

Further, in the optical modulator 3f, by individually controlling the respective voltages applied to the polarization pair groups (i.e., three successive polarization pairs 3110) in the periodically-poled structure 310 corresponding to the first electrodes 331 of the first electrode portion 33, it is possible to take a plurality of outgoing lights out from the incident light which is a linear light beam and individually control ON/OFF of the outgoing lights.

As discussed above, since the optical modulator 3f has a structure in which the voltage is applied between the first electrode portion 33 and the second electrode portion 34 provided on the upper surface 311 and the lower surface 312 of the base part 31, respectively, it is necessary to reduce the thickness of the base part 31 (i.e., the size thereof in the Z direction). The optical modulator 3f can be stably driven, however, since the strength of the optical modulator 3f can be increased by supporting the first electrode portion 33, the base part 31, and the second electrode portion 34 by the supporting member 36 in the optical modulator 3f.

Since the supporting member 36 is formed of the same material (lithium niobate) as that of the base part 31, the thermal expansion coefficient of the base part 31 is almost equal to the thermal expansion coefficient of the supporting member 36. For this reason, even if the ambient temperature of the optical modulator 3f changes, it is possible to prevent deformation, breakage, or the like of the optical modulator 3f due to the difference in thermal expansion between the supporting member 36 and the base part 31. Further, since the direction of crystal axis in the supporting member 36 is the same as that of crystal axis in an area around the periodically-poled structure 310 of the base part 31 and the second polarization part 3112 of the periodically-poled structure 310 (i.e., the direction of crystal axis in the base part raw material), it is possible to reliably prevent deformation, breakage, or the like of the optical modulator 3f due to the difference in thermal expansion between the supporting member 36 and the base part 31 even if the ambient temperature of the optical modulator 3f changes.

In the optical modulator 3f, a layer of silicon dioxide ($SiO_2$) having a thickness ranging 2 μm to 3 μm may be formed between the base part 31 and the plurality of first electrodes 331 and between the base part 31 and the second electrode 341. This prevents light going through the base part 31 from being absorbed into the first electrodes 331 and the second electrode 341 and increases the light transmission efficiency of the base part 31. In this case, in Step S21 discussed above (see FIG. 16), the layer of silicon dioxide is formed on the lower surface of the base part raw material by evaporation or CVD, and then the chromium layer and the gold layer are formed on the layer of silicon dioxide. Between Steps S25 and S26, the layer of silicon dioxide is formed on the upper surface of the base part 31 by evaporation or the like. In the case of layering the wiring board on which the first electrodes 331 are formed on the base part 31, the layer of silicon dioxide may be formed on surfaces of the first electrodes 331 on the wiring board by evaporation or the like.

Figure 17:
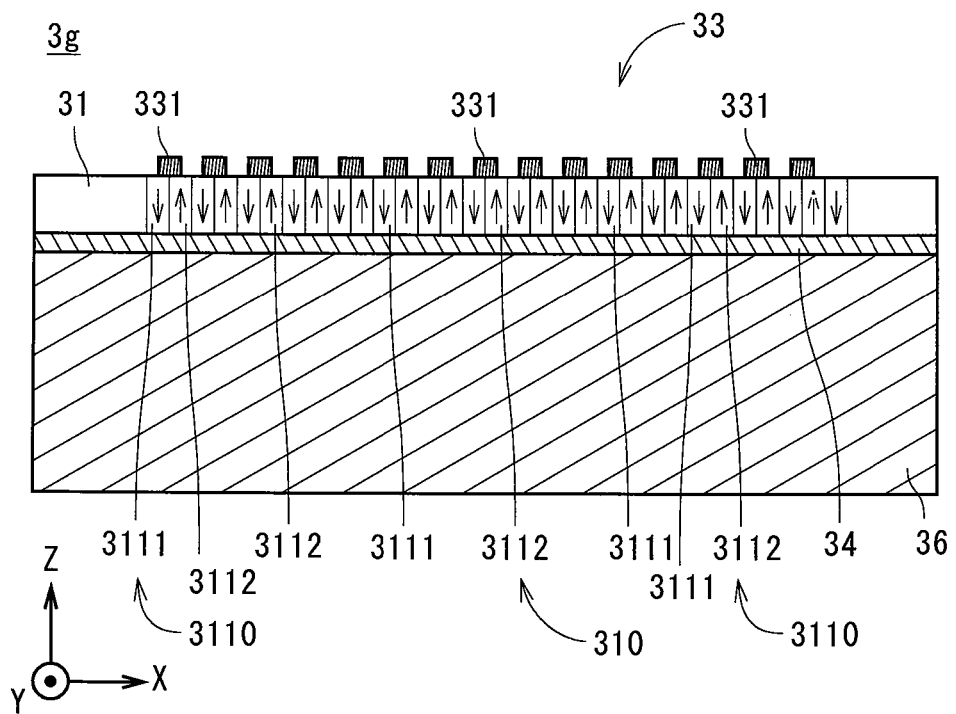
FIG. 17 is a cross section showing an optical modulator in accordance with a fifth preferred embodiment.

Next, discussion will be made on an optical modulator in accordance with the fifth preferred embodiment of the present invention. FIG. 17 shows a cross section of an optical modulator 3g in a direction perpendicular to the Y direction in accordance with the fifth preferred embodiment, which corresponds to FIG. 15 showing a cross section of the optical modulator 3f in accordance with the fourth preferred embodiment. As shown in FIG. 17, the optical modulator 3g has the same configuration as that of the optical modulator 3f shown in FIG. 15 except that the shape and the arrangement of the first electrodes 331 of the first electrode portion 33 are identical to those of the optical modulator 3d of FIG. 12. In the following discussion, constituent elements of the optical modulator 3g which correspond to those in the optical modulator 3f are represented by the same reference signs.

Like in the fourth preferred embodiment, the optical modulator 3g can be stably driven since the strength of the optical modulator 3g can be increased by supporting the first electrode portion 33, the base part 31, and the second electrode portion 34 by the supporting member 36 in the optical modulator 3g. Since the supporting member 36 is formed of the same material (lithium niobate) as that of the base part 31, even if the ambient temperature of the optical modulator 3g changes, it is possible to prevent deformation, breakage, or the like of the optical modulator 3g due to the difference in thermal expansion between the supporting member 36 and the base part 31. Further, since the direction of crystal axis in the supporting member 36 is the same as that of crystal axis in an area around the periodically-poled structure 310 of the base part 31 and the second polarization part 3112 of the periodically-poled structure 310 (i.e., the direction of crystal axis in the base part raw material), it is possible to reliably prevent deformation, breakage, or the like of the optical modulator 3g due to the difference in thermal expansion between the supporting member 36 and the base part 31 even if the ambient temperature of the optical modulator 3g changes.

Like in the second preferred embodiment, the optical modulator 3g has a configuration in which the plurality of first electrodes 331 each provided on one polarization pair 3110 (i.e., the first polarization part 3111 and the second polarization part 3112) are individually connected to the potential applying part 41 of the control part 4 (see FIG. 14) and a potential is applied individually to the plurality of first electrodes 331. Therefore, by changing the control over the potential applying part 41 by the control part 4, it is possible to easily change the number of first electrodes 331 arranged successively in the electrode array direction, to which the same potential is always applied. As a result, the unit of change for the length of the irradiation region on the recording material 9 (see FIG. 14) in the X direction can be made smaller (in other words, the address resolution can be increased). In other words, the control pitch of the optical modulator 3g can be reduced.

Figure 18:
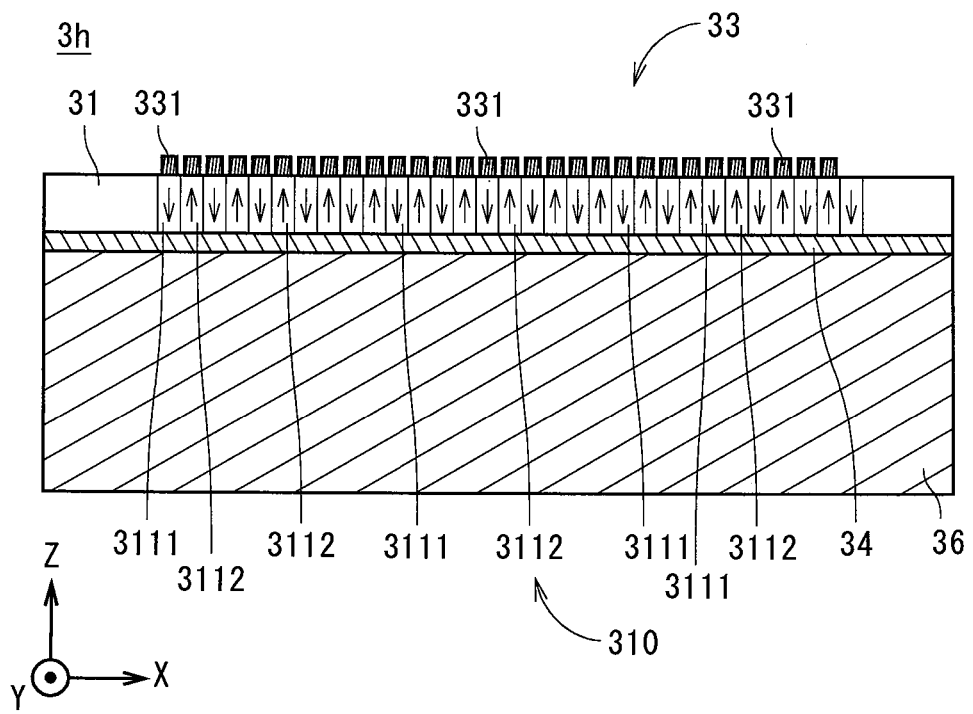
FIG. 18 is a cross section showing an optical modulator in accordance with a sixth preferred embodiment.

Next, discussion will be made on an optical modulator in accordance with the sixth preferred embodiment of the present invention. FIG. 18 shows a cross section of an optical modulator 3h in a direction perpendicular to the Y direction in accordance with the sixth preferred embodiment, which corresponds to FIG. 15 showing a cross section of the optical modulator 3f in accordance with the fourth preferred embodiment. As shown in FIG. 18, the optical modulator 3h has the same configuration as that of the optical modulator 3f shown in FIG. 15 except that the shape and the arrangement of the first electrodes 331 of the first electrode portion 33 are identical to those of the optical modulator 3e of FIG. 13. In the following discussion, constituent elements of the optical modulator 3h which correspond to those in the optical modulator 3f are represented by the same reference signs.

Like in the fourth preferred embodiment, the optical modulator 3h can be stably driven since the strength of the optical modulator 3h can be increased by supporting the first electrode portion 33, the base part 31, and the second electrode portion 34 by the supporting member 36 in the optical modulator 3h. Since the supporting member 36 is formed of the same material (lithium niobate) as that of the base part 31, even if the ambient temperature of the optical modulator 3h changes, it is possible to prevent deformation, breakage, or the like of the optical modulator 3h due to the difference in thermal expansion between the supporting member 36 and the base part 31. Further, since the direction of crystal axis in the supporting member 36 is the same as that of crystal axis in an area around the periodically-poled structure 310 of the base part 31 and the second polarization part 3112 of the periodically-poled structure 310 (i.e., the direction of crystal axis in the base part raw material), it is possible to reliably prevent deformation, breakage, or the like of the optical modulator 3h due to the difference in thermal expansion between the supporting member 36 and the base part 31 even if the ambient temperature of the optical modulator 3h changes.

Like in the third preferred embodiment, the optical modulator 3h has a configuration in which the plurality of first electrodes 331 each provided on one polarization part are individually connected to the potential applying part 41 of the control part 4 and a potential is applied individually to the plurality of first electrodes 331. Therefore, by changing the control over the potential applying part 41 by the control part 4, it is possible to easily change the number of first electrodes 331 arranged successively in the electrode array direction, to which the same potential is always applied. As a result, the unit of change for the length of the irradiation region on the recording material 9 (see FIG. 14) in the X direction can be made smaller (in other words, the address resolution can be increased). In other words, the control pitch of the optical modulator 3h can be reduced.

In the optical modulator 3h, like in the optical modulator 3f of the fourth preferred embodiment, the periodically-poled structure 310 of the base part 31 is formed by applying very high voltage of the Z direction to the portion to become the first polarization part 3111 in the base part 31 before the periodically-poled structure 310 is formed and thereby reversing the direction of polarization in the portion to become the first polarization part 3111. In a process for forming the periodically-poled structure 310 in the optical modulator 3h, since the above high voltage is applied by using the first electrodes 331 provided on the portions to become the first polarization parts 3111 (i.e., every other first electrodes 331 among the plurality of first electrodes 331 arrayed in the electrode array direction), the optical modulator 3h can be easily manufactured. Specifically, instead of Step S23 in FIG. 16, thirty first electrodes 331 are formed on the base part raw material, and in Step S24, a high potential is applied to the fifteen first electrodes 331 provided on the portions to become the first polarization parts 3111, to thereby form the first polarization parts 3111. In this case, Step S25 is not executed.

Though the preferred embodiments of the present invention have been discussed above, the present invention is not limited to the above-discussed preferred embodiments, but allows various variations.

In the optical modulator 3 of FIG. 3, for example, the polarization pair group corresponding to one first electrode 331 of the first electrode portion 33 may include a predetermined number of polarization pairs 3110, the number of which is not less than four, arranged successively in the polarization-part array direction. Thus, since the first electrode 331 is disposed on the polarization part group including a predetermined number of, i.e., three or more polarization pair arranged successively in the polarization-part array direction, like in the first preferred embodiment, it is possible to produce a desired electric field in the Z direction inside the periodically-poled structure 310 while reducing the voltage applied between the first electrode portion 33 and the second electrode portion 34, and the rate of the optical modulation performed by the optical modulator 3 can be increased. Since the pitch of the first electrodes 331 can be reduced while the discharge is prevented from being produced between the adjacent first electrodes 331, a high-density channel arrangement can be achieved. In the second electrode portion 34, instead of the second electrode 341 which is a common electrode, a plurality of second electrodes may be so provided as to face the plurality of first electrodes 331 with the base part 31 interposed therebetween, and voltage may be applied individually to a plurality of pairs of first electrode 331 and the second electrode 341.

In the optical modulator 3d of the second preferred embodiment, for example, one first electrode 331 of the first electrode portion 33 may be provided on three or four polarization parts arranged successively in the polarization-part array direction. Thus, since the first electrode 331 is provided on the polarization part group including a predetermined number of, i.e., four or less first polarization parts 3111 and second polarization parts 3112 (this also includes a case where one polarization part (the first polarization part 3111 or the second polarization part 3112) corresponds to the polarization part group like in the optical modulator 3e of the third preferred embodiment), like in the second and third preferred embodiments, it is possible to produce a desired electric field in the Z direction inside the periodically-poled structure 310 while reducing the voltage applied between the first electrode portion 33 and the second electrode portion 34, and the rate of the optical modulation performed by the optical modulator 3 can be increased. Further, since the pitch of the first electrodes 331 can be reduced while the discharge is prevented from being produced between the adjacent first electrodes 331, a high-density channel arrangement can be achieved.

In the optical modulators 3f to 3h of the fourth to sixth preferred embodiments, the supporting member 36 does not always need to be provided below the second electrode portion 34 but may be provided, for example, above the first electrode portion 33 (on a side of the first electrode portion 33 opposite to the base part 31) or both above the first electrode portion 33 and below the second electrode portion 34. In other words, the supporting member 36 has only to be provided on a side of the first electrode portion 33 opposite to the base part 31 or on a side of the second electrode portion 34 opposite to the base part 31.

In the above-discussed optical modulators 3d to 3h, instead of the base part 31, the base parts 31a to 31c shown in FIGS. 8 to 10 may be provided.

In the optical modulators 3 and 3a to 3h, the thickness of the base part may be changed as appropriate. In terms of suppressing the energy loss of the light going through the base part, however, it is preferable that the thickness of the base part should be not smaller than 3 μm. The waveguides 315 and 315a in the optical modulators 3b and 3c may be formed by a method other than the annealed proton exchange method.

In the optical modulators 3 and 3a to 3h, the periodically-poled structure may serve as a diffraction grating for producing Bragg diffraction by applying voltage to the periodically-poled structure of the base part. In this case, the traveling direction of light entering the periodically-poled structure 310 is a direction inclined at such an angle as to satisfy the Bragg condition with respect to the direction perpendicular to the polarization-part array direction. The electrode array direction in which the plurality of first electrodes 331 are arrayed may be parallel to the polarization-part array direction or may be a direction perpendicular to the above traveling direction of light.

Though the ON/OFF control over the irradiation of light to the irradiation position of the light on the recording material 9 is performed in the optical modulators 3 and 3a to 3h, the control over irradiation of multitone light may be performed by controlling the voltage applied between the first electrode portion 33 and the second electrode portion 34.

In the image recording apparatus, though only the zeroth order lights from the optical modulator (3, 3a to 3h) are guided onto the recording material 9 by the projection optical system 23, depending on the design of the image recording apparatus, there may be a configuration where the zeroth order lights from the optical modulator are blocked and the plus and minus first order diffracted lights are guided onto the recording material. In other words, either the zeroth order lights or the plus and minus first order diffracted lights from the optical modulator are guided onto the recording material 9 by the projection optical system 23, and it is thereby possible to record an image through the modulation control by the optical modulator in the image recording apparatus.

The image recording apparatus provided with the optical modulator (3, 3a to 3h) may have a structure to record an image by controlling the optical modulator while moving the irradiation positions of the lights from the optical modulator on a plate-like recording material mounted on a stage relatively to the recording material by a scanning mechanism for moving the optical head along the recording material relatively to the recording material. Further, in the image recording apparatus, the irradiation positions of the lights on the recording material 9 may be moved in the X direction by providing a polygon mirror in the optical head.

The recording material for holding information on an image may be other material coated with a photosensitive material or having photosensitivity, such as a printed circuit board, a semiconductor substrate, or the like, or a material responsive to heat due to the irradiation of light. The optical modulators 3 and 3a to 3h may be used for the purpose other than image recording, and in this case, an object to be irradiated with light may be something other than the recording material.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2008-332119 filed in the Japan Patent Office on Dec. 26, 2008, Japanese Patent Application No. 2008-332120 filed in the Japan Patent Office on Dec. 26, 2008, and Japanese Patent Application No. 2008-332121 filed in the Japan Patent Office on Dec. 26, 2008, the entire disclosures of which are incorporated herein by reference.

The invention claimed is:

1. An optical modulator, comprising:
a base part which is a plate-like member formed of a material of which the refractive index is changed by an electric field, having a periodically-poled structure in which a first polarization part and a second polarization part which are opposite in the direction of polarization produced when said electric field is applied are alternately arranged in a polarization-part array direction; and
a modulation part having a first electrode portion provided on one main surface of said base part and a second electrode portion provided on the other main surface of said base part, which applies voltage between said first electrode portion and said second electrode portion to thereby cause a periodic change of said refractive index in said polarization-part array direction in said periodically-poled structure,
wherein a linear light beam spreading out in said polarization-part array direction enters said base part from one end surface thereof, being guided inside said base part in a traveling direction in which said light beam is diffracted by said periodic change of said refractive index, and exits from the other end surface,
said first electrode portion comprises a plurality of first electrodes arranged in an electrode array direction parallel to said polarization-part array direction or perpendicular to said traveling direction,
each of said plurality of first electrodes is disposed on a polarization part group including a predetermined number of first polarization parts and/or second polarization parts which are arranged successively in said polarization-part array direction, and
voltages applied between said plurality of first electrodes and said second electrode portion are equal and individually controlled.

2. The optical modulator according to claim 1, wherein
said traveling direction is perpendicular to said polarization-part array direction.

3. The optical modulator according to claim 2, wherein
said polarization part group includes a predetermined number, which is three or more, of polarization pairs arranged successively in said polarization-part array direction and each of said polarization pairs includes said first polarization part and said second polarization part which are adjacent to each other in said polarization-part array direction.

4. The optical modulator according to claim 3, further comprising
a supporting member provided on an opposite side of said first electrode portion to said base part or on an opposite side of said second electrode portion to said base part, for supporting said first electrode portion, said base part, and said second electrode portion.

5. The optical modulator according to claim 2, wherein
said polarization part group includes a predetermined number, which is four or less, of first polarization parts and second polarization parts which are arranged successively in said polarization-part array direction.

6. The optical modulator according to claim 5, further comprising
a supporting member provided on an opposite side of said first electrode portion to said base part or on an opposite side of said second electrode portion to said base part, for supporting said first electrode portion, said base part, and said second electrode portion.

7. The optical modulator according to claim 2, further comprising
a supporting member provided on an opposite side of said first electrode portion to said base part or on an opposite side of said second electrode portion to said base part, for supporting said first electrode portion, said base part, and said second electrode portion.

8. The optical modulator according to claim 2, wherein
said linear light beam is propagated inside said base part in a single mode.

9. The optical modulator according to claim 2, wherein
an annealed/proton-exchanged waveguide is formed near said one main surface of said base part, and
said linear light beam is propagated inside said waveguide.

10. The optical modulator according to claim 2, wherein
an annealed/proton-exchanged waveguide is formed near the center portion of said base part in a thickness direction, and
said linear light beam is propagated inside said waveguide.

11. The optical modulator according to claim 1, wherein
said polarization part group includes a predetermined number, which is three or more, of polarization pairs arranged successively in said polarization-part array direction and each of said polarization pairs includes said first polarization part and said second polarization part which are adjacent to each other in said polarization-part array direction.

12. The optical modulator according to claim 11, further comprising
a supporting member provided on an opposite side of said first electrode portion to said base part or on an opposite side of said second electrode portion to said base part, for supporting said first electrode portion, said base part, and said second electrode portion.

13. The optical modulator according to claim 1, wherein
said polarization part group includes a predetermined number, which is four or less, of first polarization parts and second polarization parts which are arranged successively in said polarization-part array direction.

14. The optical modulator according to claim 13, further comprising
a supporting member provided on an opposite side of said first electrode portion to said base part or on an opposite side of said second electrode portion to said base part, for supporting said first electrode portion, said base part, and said second electrode portion.

15. The optical modulator according to claim 1, further comprising
a supporting member provided on an opposite side of said first electrode portion to said base part or on an opposite side of said second electrode portion to said base part, for supporting said first electrode portion, said base part, and said second electrode portion.

16. The optical modulator according to claim 1, wherein said linear light beam is propagated inside said base part in a single mode.

17. The optical modulator according to claim 1, wherein an annealed/proton-exchanged waveguide is formed near said one main surface of said base part, and said linear light beam is propagated inside said waveguide.

18. The optical modulator according to claim 1, wherein an annealed/proton-exchanged waveguide is formed near the center portion of said base part in a thickness direction, and said linear light beam is propagated inside said waveguide.

* * * * *